(12) United States Patent
Lee et al.

(10) Patent No.: US 9,578,156 B2
(45) Date of Patent: Feb. 21, 2017

(54) METHOD AND APPARATUS FOR OPERATING AN ELECTRONIC DEVICE

(71) Applicant: Samsung Electronics Co., Ltd., Gyeonggi-do (KR)

(72) Inventors: Woo-Kwang Lee, Gyeonggi-do (KR); Yeon-Jung Kim, Gyeonggi-do (KR); Sang-Hyun Lee, Gyeonggi-do (KR); Jae-Bong Chun, Gyeonggi-do (KR); Sang-Bum Han, Gyeonggi-do (KR); Kyung-Tak Hur, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/870,354

(22) Filed: Sep. 30, 2015

(65) Prior Publication Data

US 2016/0094700 A1  Mar. 31, 2016

(30) Foreign Application Priority Data

Sep. 30, 2014 (KR) .................. 10-2014-0131103
Sep. 30, 2015 (KR) .................. 10-2015-0137472

(51) Int. Cl.
| | |
|---|---|
| *H04M 3/00* | (2006.01) |
| *H04M 1/725* | (2006.01) |
| *H04W 4/10* | (2009.01) |
| *H04B 1/3827* | (2015.01) |
| *H04W 8/24* | (2009.01) |

(52) U.S. Cl.
CPC ........... *H04M 1/7253* (2013.01); *H04B 1/385* (2013.01); *H04W 4/10* (2013.01); *H04W 8/245* (2013.01); *H04M 1/72597* (2013.01)

(58) Field of Classification Search
CPC .. H04M 1/7253; H04M 1/72597; H04W 4/10; H04W 1/385; H04B 1/385
USPC .................. 455/419, 418, 420, 414.1, 412.2
See application file for complete search history.

(56) References Cited

U.S. PATENT DOCUMENTS

| | | | | |
|---|---|---|---|---|
| 8,957,835 B2 * | 2/2015 | Hoellwarth | .......... | G02B 27/017 345/8 |
| 9,286,482 B1 * | 3/2016 | Dumont | .................. | G06F 21/32 |
| 2003/0233155 A1 * | 12/2003 | Slemmer | .............. | G05B 13/028 700/13 |
| 2004/0072592 A1 * | 4/2004 | Hasegawa | ............. | H04W 48/04 455/558 |

(Continued)

FOREIGN PATENT DOCUMENTS

| | | |
|---|---|---|
| KR | 20-0360056 Y1 | 8/2004 |
| KR | 10-2004-0089032 A | 10/2004 |

(Continued)

*Primary Examiner* — Khai M Nguyen
(74) *Attorney, Agent, or Firm* — Cha & Reiter, LLC

(57) ABSTRACT

An electronic device comprising: a communication interface; a memory; and at least one processor coupled to the memory and the communication interface, wherein the at least one processor is configured to: detect a change of state of the electronic device; transmit to a secondary electronic device a first information item associated with the change of state of the electronic device; receive a second information item from the secondary electronic device in response to the first information item; and perform an operation based on the secondary information item.

24 Claims, 20 Drawing Sheets

(56) References Cited

U.S. PATENT DOCUMENTS

| | | | |
|---|---|---|---|
| 2011/0045809 A1* | 2/2011 | Yu | H04L 12/2827 |
| | | | 455/414.1 |
| 2012/0188981 A1* | 7/2012 | Chang | H04W 76/023 |
| | | | 370/331 |
| 2013/0303140 A1* | 11/2013 | Sylvain | H04W 4/043 |
| | | | 455/417 |
| 2015/0117340 A1* | 4/2015 | Kawakami | H04W 8/005 |
| | | | 370/329 |
| 2015/0141043 A1* | 5/2015 | Abramson | G01C 21/34 |
| | | | 455/456.1 |
| 2015/0382321 A1* | 12/2015 | Ryu | H04W 68/02 |
| | | | 455/458 |

FOREIGN PATENT DOCUMENTS

| | | |
|---|---|---|
| KR | 10-2004-0094971 A | 11/2004 |
| KR | 10-2004-0105420 A | 12/2004 |
| KR | 10-2005-0101879 A | 10/2005 |

* cited by examiner

METHOD AND APPARATUS FOR OPERATING AN ELECTRONIC DEVICE

CLAIM OF PRIORITY

This application claims the priority under 35 U.S.C. §119(a) to Korean Application Serial No. 10-2014-0131103, which was filed in the Korean Intellectual Property Office on Sep. 30, 2014 and Korean Application Serial No. 10-2015-0137472, which was filed in the Korean Intellectual Property Office on Sep. 30, 2015, the entire contents of which are hereby incorporated by reference.

TECHNICAL FIELD

Various embodiments of the present disclosure relate to electronic devices in general, and more particularly to a method and apparatus for operating an electronic device.

BACKGROUND

Electronic devices, such as smart phones or tablet PCs, may be excellent educational electronic devices in that they can execute games or various mobile applications for educational purposes as well as animations for children or educational video content. Such electronic devices may mostly provide specialized functions (e.g., videos, games, or educational applications) for children or widget forms of functions that children like.

SUMMARY

Existing electronic devices control themselves by configuring a specific mode (e.g., a "kids" mode) therein in order to simply control the time spent by specific subjects (e.g., users or children) using the electronic devices and to restrict applications (or programs) or content to be used. Furthermore, the existing specific mode simply provides specialized applications and UXs for children and the control functions that control the electronic devices are limited.

According to various embodiments of the present disclosure, a first electronic device and a second electronic device interwork with each other, and the first electronic device can manage and restrict the use of the second electronic device for a specific subject (e.g., a child).

According to various embodiments of the present disclosure, the first and second electronic devices interwork with each other, and various different functions (e.g., a notification function, a remote control function, a push to talk (PTT) function, etc.) can be provided to subjects (e.g., a parent and a child) who use the first and second electronic devices.

According to various embodiments, a specific mode configured for the second electronic device (e.g., a smart phone or a tablet PC) can be executed and managed by the first electronic device (e.g., a wearable device or a smart phone), and when a specific subject (e.g., a child) uses the second electronic device, the second electronic device can provide various types of information on the use thereof to the first electronic device, and the first electronic device can restrict the operations of the second electronic device by providing various types of information of the second electronic device.

According to various embodiments of the present disclosure, an electronic device can be controlled through at least one other electronic device, process execution, configuration, or release of a specific mode in response to a control of the other electronic device, and can provide various feedback for the processing result to the other electronic device.

According to aspects of the disclosure, an electronic device is provided comprising: a communication interface; a memory; and at least one processor coupled to the memory and the communication interface, wherein the at least one processor is configured to: detect a change of state of the electronic device; transmit to a secondary electronic device a first information item associated with the change of state of the electronic device; receive a second information item from the secondary electronic device in response to the first information item; and perform an operation based on the secondary information item.

According to aspects of the disclosure, a method comprising: establishing a wireless connection between a first device and a second device; detecting a change of state of the first device; transmitting from the first device to the second device a first information item associated with the change of state of the first device; receiving, by the first device, a second information item that is transmitted by the second device in response to the first information item; and performing, by the first device, an operation based on the second information item.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
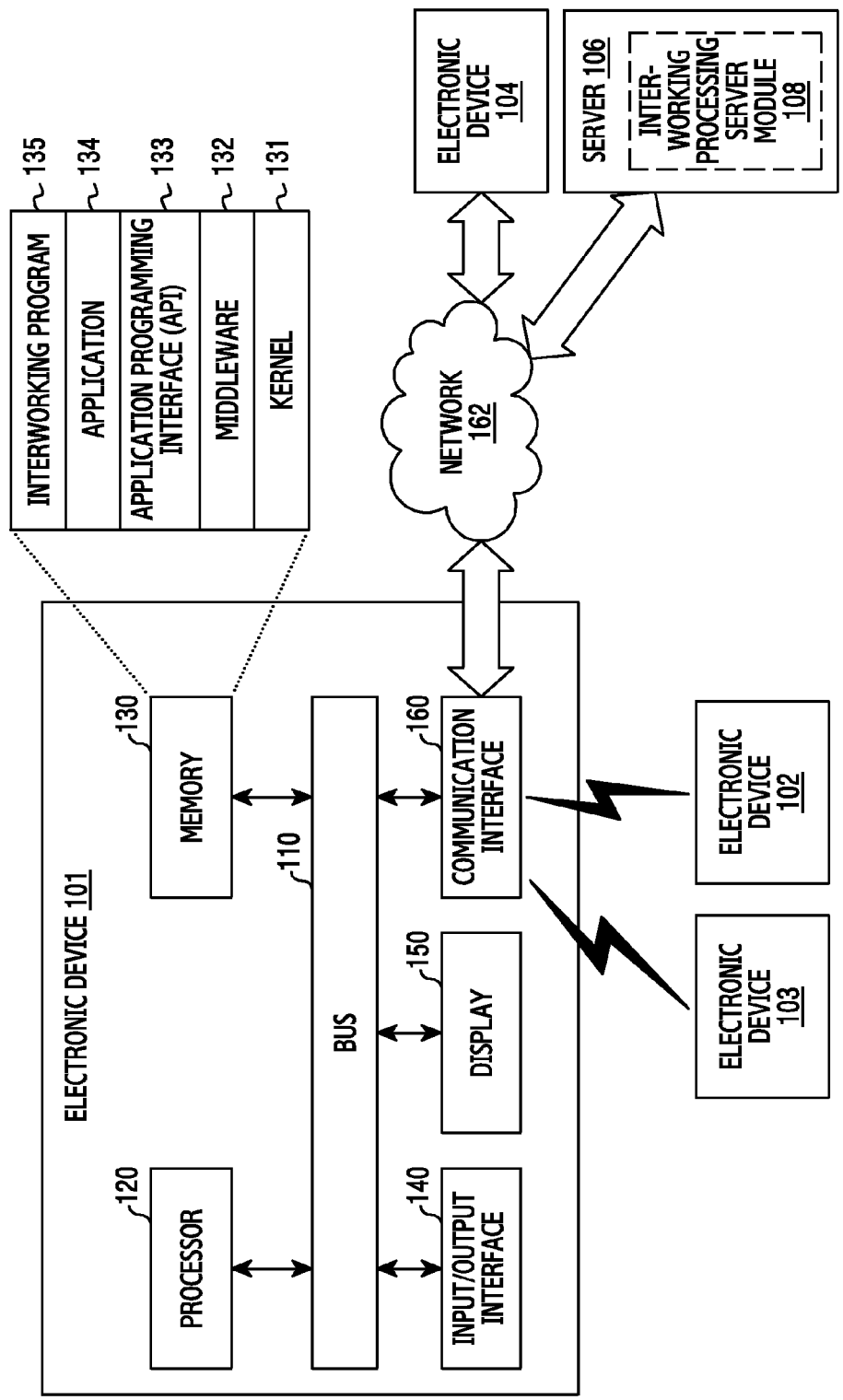
FIG. 1 is a block diagram of an example of a network environment, according to various embodiments of the present disclosure.

Hereinafter, various embodiments of the present disclosure will be described in connection with the accompanying drawings.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications, equivalents, and/or alternatives within the spirit and scope of the present disclosure. In the description of the drawings, similar reference numerals may be used to designate similar elements.

As used in various embodiments of the present disclosure, the expressions "include", "may include" and other conjugates refer to the existence of a corresponding disclosed function, operation, or constituent element, and do not limit one or more additional functions, operations, or constituent elements. Further, as used in various embodiments of the present disclosure, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element may be termed a second element, and likewise a second element may also be termed a first element without departing from the scope of various embodiments of the present disclosure.

When an element is referred to as being "coupled" or "connected" to any other element, it should be understood that not only the element may be coupled or connected directly to the other element, but also a third element may be interposed therebetween. Contrarily, when an element is referred to as being "directly coupled" or "directly connected" to any other element, it should be understood that no element is interposed therebetween.

The terms as used in various embodiments of the present disclosure are used merely to describe a certain embodiment and are not intended to limit the present disclosure. As used herein, singular forms may include plural forms as well unless the context explicitly indicates otherwise. Furthermore, all terms used herein, including technical and scientific terms, have the same meaning as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

An electronic device according to various embodiments of the present disclosure may be a device including a communication function. For example, the electronic device may include at least one of a Smartphone, a Tablet Personal Computer (PC), a Mobile Phone, a Video Phone, an Electronic Book (e-book) reader, a Desktop PC, a Laptop PC, a Netbook Computer, a Personal Digital Assistant (PDA), a Portable Multimedia Player (PMP), an MP3 player, a Mobile Medical Appliance, a Camera, and a Wearable Device (e.g. a Head-Mounted-Device (HMD) such as electronic glasses, electronic clothes, an electronic bracelet, an electronic necklace, an electronic appcessory, electronic tattoos, or a smartwatch).

According to some embodiments, the electronic device may be a smart home appliance with a communication function. For example, the smart home appliance may include at least one of a television, a digital video disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to some embodiments, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter).

The electronic device according to various embodiments of the present disclosure may be a combination of one or more of the aforementioned various devices. Further, the electronic device according to various embodiments of the present disclosure may be a flexible device. Further, it will be apparent to those skilled in the art that the electronic device according to various embodiments of the present disclosure is not limited to the aforementioned devices.

Hereinafter, an electronic device according to various embodiments of the present disclosure will be described with reference to the accompanying drawings. The term "user" as used in various embodiments of the present disclosure may indicate a person who uses an electronic device or a device (e.g., artificial intelligence electronic device) that uses an electronic device.

FIG. 1 is a block diagram of an example of a network environment, according to various embodiments.

Referring to FIG. 1, an electronic device 101 may include at least one of a bus 110, a processor 120, a memory 130, an input/output interface 140, a display 150, and a communication interface 160.

The bus 110 may be a circuit that interconnects the aforementioned elements and transmits communication signals (e.g., control messages) between the aforementioned elements.

The processor 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. In operation, the processor 120 may, for example, receive instructions from the other aforementioned elements (e.g., the memory 130, the input/output interface 140, the display 150, and the communication interface 160) via the bus 110, decode the received instructions, and perform calculations or data processing according to the decoded instructions.

At least one processor 120 may be included in the electronic device 101 to perform a specified function of the electronic device 101. According to an embodiment, the processor 120 may include one or more application processors (APs) and one or more microcontroller units (MCUs). According to another embodiment, the processor 120 may include one or more microcontroller units as applications, or may be functionally connected to one or more microcontroller units. In FIG. 1, the APs and the MCUs may be included in one IC package, or may be separately configured to be included in different IC packages, respectively. According to an embodiment, the MCUs may also be included in an IC package of the APs so as to be configured as one IC package together with the APs. Although the processor 120 is illustrated as including the APs or the MCUs, it is nothing more than an embodiment for clear understanding, and it is apparent that the processor 120 may also perform the operations of the APs and/or the MCUs.

According to various embodiments of the present disclosure, the processor 120 may control operations relating to the interworking between electronic devices. In the various embodiments, in instances in which the electronic device operates as a parent terminal for controlling a counterpart electronic device connected thereto, the processor 120 may process the performance of various operations relating to the controlling of the counterpart electronic device. In the various embodiments, in instances in which the electronic device operates as a child terminal that operates under the control of a counterpart electronic device connected thereto, the processor 120 may sense the control of the counterpart electronic device, the state of the electronic device, and the state of a user, and may process the performance of various operations corresponding to them. In the various embodiments, the processor 120 may include an interworking program 135, which will be described below, and may process the function of the interworking program 135. In the various embodiments, the processor 120 may include a specific program or at least one element of a specific module to perform at least one of the operations that the specific program or module performs (e.g., to perform at least one operation on behalf of the specific program or module). In the various embodiments of the present disclosure, various processing operations that the processor 120 performs according to operating agents will be described below with reference to drawings (e.g., FIGS. 2 to 18).

For example, according to the various embodiments, the processor 120 may sense a specific situation and may transmit a notification message for the situation through the communication interface to the other electronic device, and may control a mode on the basis of the control message received from the other electronic device. The processor 120 may process a situation in which a specified user, who is using the electronic device, is identified or a specific situation in which the electronic device is activated. The processor 120 may process a determined message to perform a preset specific mode in correspondence to the specified user. The processor 120 may change to a mode for restricting the execution of at least one program. In instances in which the received control message does not include a user input, the processor 120 may refrain from changing the mode. In instances in which the user's detected biometric information is beyond a specified range, the processor 120 may detect it. The processor 120 may back up at least a part of a user interface, data, and setting information at the time of a mode change, and may perform a restoring function on the basis of the backup at the time of the termination of the changed mode. The processor 120 may identify the quality of communication with the other electronic device and may change to at least one of a real-time call connection and a limited call connection on the basis of the communication quality.

The APs may control a plurality of hardware or software elements connected thereto and may perform processing and operations on various types of data including multimedia data by driving an operating system or application programs (or applications). The APs may be embodied as, for example, a System on Chip (SoC). According to an embodiment, the processor 120 may further include a graphic processing unit (GPU) (not illustrated).

The MCUs may be processors configured to perform specified operations. According to an embodiment, the MCUs may acquire sensing information through one or more specified motion sensors (e.g., a gyro sensor, an acceleration sensor, and a geomagnetic sensor), compare the acquired sensing information, and determine the respective operating states of the specified sensors with reference to a database of the electronic device 101.

According to an embodiment, the APs or the MCUs may load instructions or data received from at least one of non-volatile memories or other elements connected thereto in volatile memories, and may process the loaded instructions or data. Furthermore, the APs or the MCUs may store data received from or generated by at least one of the other elements in the non-volatile memories.

The memory 130 may include any suitable type of volatile or non-volatile memory, such as Random Access Memory (RAM), Read-Only Memory (ROM), Network Accessible Storage (NAS), cloud storage, a Solid State Drive (SSD), etc. In operation, the memory 130 may store instructions or data received from or generated by the processor 120 or the other elements (e.g., the input/output interface 140, the display 150, and the communication interface 160). The memory 130 may include programming modules, for example, a kernel 131, middleware 132, an application programming interface (API) 133, applications 134, or the like. Each of the above-described programming modules may be configured with software, firmware, hardware, or a combination of two or more thereof.

The kernel 131 may control or manage system resources (e.g., the bus 110, the processor 120, the memory 132, and the like) used to execute operations or functions implemented in the remaining programming modules, for example, the middleware 133, the API 134, and the applications 134. Also, the kernel 131 may provide an interface that allows the middleware 132, the API 133, or the application 134 to access, control, or manage individual elements of the electronic device 101.

The middleware 132 may function as an intermediary that allows the API 133 or the applications 134 to communicate with the kernel 131 in order to exchange data. Furthermore, in connection with task requests received from the applications 134, the middleware 132 may perform a control (e.g., scheduling or load balancing) on the task requests by using, for example, a method of assigning a priority to use system resources of the electronic device (e.g., the bus 110, the processor 120, the memory 130, or the like) to at least one of the applications 134.

The API 133, which is an interface for allowing the applications 134 to control functions provided by the kernel 131 or the middleware 132, may include, for example, at least one interface or function (e.g., an instruction) for a file control, a window control, image processing, a text control, or the like.

The applications 134 may include a short message service (SMS)/multimedia message service (MMS) application, an e-mail application, a calendar application, an alarm application, a health care application (e.g., an application for measuring physical activity or blood glucose), and an environmental information application (e.g., an application for providing atmospheric pressure, humidity, or temperature information). The applications (or processors) 134 may include an application associated with the exchange of information between the electronic device 101 and an external electronic device (e.g., an electronic device 102 or 104). The application associated with the exchange of information may include, for example, a notification relay application for transferring specific information to an external electronic device or a device management application for managing an external electronic device. The notification relay application may, for example, include a function of transferring, to an external electronic device (e.g., the electronic device 104), notification information generated by other applications (e.g., an SMS/MMS application, an e-mail application, a health care application, or an environmental information application) of the electronic device 101.

Additionally or alternatively, the notification relay application may receive notification information from, for example, an external electronic device (e.g., the electronic device 104) and provide the received notification information to a user. The device management application may, for example, manage (e.g., install, delete, or update) functions for at least a part of an external electronic device (e.g., the electronic device 104) communicating with the electronic device 101 (e.g., turning on/off the external electronic device itself (or some elements thereof) or adjusting the brightness (or resolution) of a display), applications operating in the external electronic device, or services (e.g., a telephone call service or a message service) provided by the external electronic device. According to various embodiments, the applications 134 may include an application specified according to the attribute (e.g., type) of an external electronic device (e.g., the electronic device 102 or 104). For example, in instances in which an external electronic device is an MP3 player, the applications 134 may include an application relating to the reproduction of music. Similarly, in instances in which an external electronic device is a mobile medical appliance, the applications 134 may include an application relating to health care. According to an embodiment, the applications 134 may include at least one of applications specified to the electronic device 101 and applications received from an external electronic device (e.g., a server 106 or the electronic device 104).

In the various embodiments of the present disclosure, the interworking program 135 included in the applications 134 may be provided, or the interworking program 135 may be stored as a separate program in the memory 130.

The interworking program 135 may sense a specific situation and transmit a notification message for the situation through the communication interface to the other electronic device, and may control a mode on the basis of the control message received from the other electronic device. The interworking program 135 may process a situation in which a specified user using the electronic device is identified or a specific situation where the electronic device is activated. The interworking program 135 may process a determined message to perform a preset specific mode in correspondence to the specified user. The interworking program 135 may change to a mode for restricting the execution of at least one program. In instances in which the received control message does not include a user input, the interworking program 135 refrain from changing the mode. In instances in which the user's detected biometric information is beyond a specified range, the interworking program 135 may detect it. The interworking program 135 may back up at least a part of a user interface, data, and setting information at the time that the mode is changed and may perform a restoring function on the basis of the backup at the time that the changed mode is terminated. The interworking program 135 may identify the quality of communication with the other electronic device and change to at least one of a real-time call connection and a limited call connection on the basis of the communication quality.

The input/output interface 140 may forward instructions or data input from a user through an input/output device (e.g., various sensors, such as an acceleration sensor or a gyro sensor, and/or a device such as a keyboard or a touch screen), to the processor 120, the memory 130, or the communication interface 160 through the bus 110. For example, the input/output interface 140 may provide the processor 120 with data on a user' touch entered on a touch screen. Furthermore, the input/output interface 140 may output instructions or data, received from, for example, the processor 120, the memory 130, or the communication interface 160 via the bus 110, through an output unit (e.g., a speaker or the display 150). For example, the input/output interface 140 may output voice data processed by the processor 120 to a user through a speaker.

The display 150 may display various types of information (e.g., multimedia data or text data) to a user. In addition, the display 150 may include an input unit and may also be configured with a touch screen to which an instruction is input by a touch or by a proximity touch of the input unit on the display 150.

The communication interface 160 (e.g., a communication module 220) may establish a communication connection between the electronic device 101 and an external device (e.g., the electronic device 104 or the server 106). For example, the communication interface 160 may be connected to a network 162 through wireless or wired communication to communicate with an external device. The wireless communication may include at least one of, for example, Wi-Fi, Bluetooth (BT), near field communication (NFC), a global positioning system (GPS), and cellular communication (e.g., LTE, LTE-A, CDMA, WCDMA, UMTS, WiBro, GSM, etc.). The wired communication may include at least one of, for example, a universal serial bus (USB), a high definition multimedia interface (HDMI), recommended standard 232 (RS-232), and a plain old telephone Service (POTS).

According to an embodiment, the network 162 may be a telecommunication network. The communication network may include at least one of a computer network, the Internet, the Internet of Things, and a telephone network. According to an embodiment, at least one of the applications 134, the application programming interface 133, the middleware 132, the kernel 131, and the communication interface 160 may support a protocol (e.g., a transport layer protocol, a data link layer protocol, or a physical layer protocol) for communication between the electronic device 101 and an external device.

According to an embodiment, the server 106 may support the driving of the electronic device 101 by performing at least one of the operations (or functions) implemented in the electronic device 101. For example, the server 106 may include a server module (e.g., a server controller or a server process, not illustrated) that may support the processor 120 which controls the electronic device 101 to perform various embodiments of the present disclosure to be described below or a specific module specified to perform the various embodiments. For example, the server module may include at least one element of the processor 120 or the specific module to perform at least one of the operations performed by the processor 120 or the specific module (e.g., perform the operations on behalf of the processor 120 or the specific module). According to various embodiments, the server module may be represented as an interworking processing server module 108 of FIG. 1. Various embodiments may be provided through FIGS. 2 to 18 to be described below.

Figure 2:
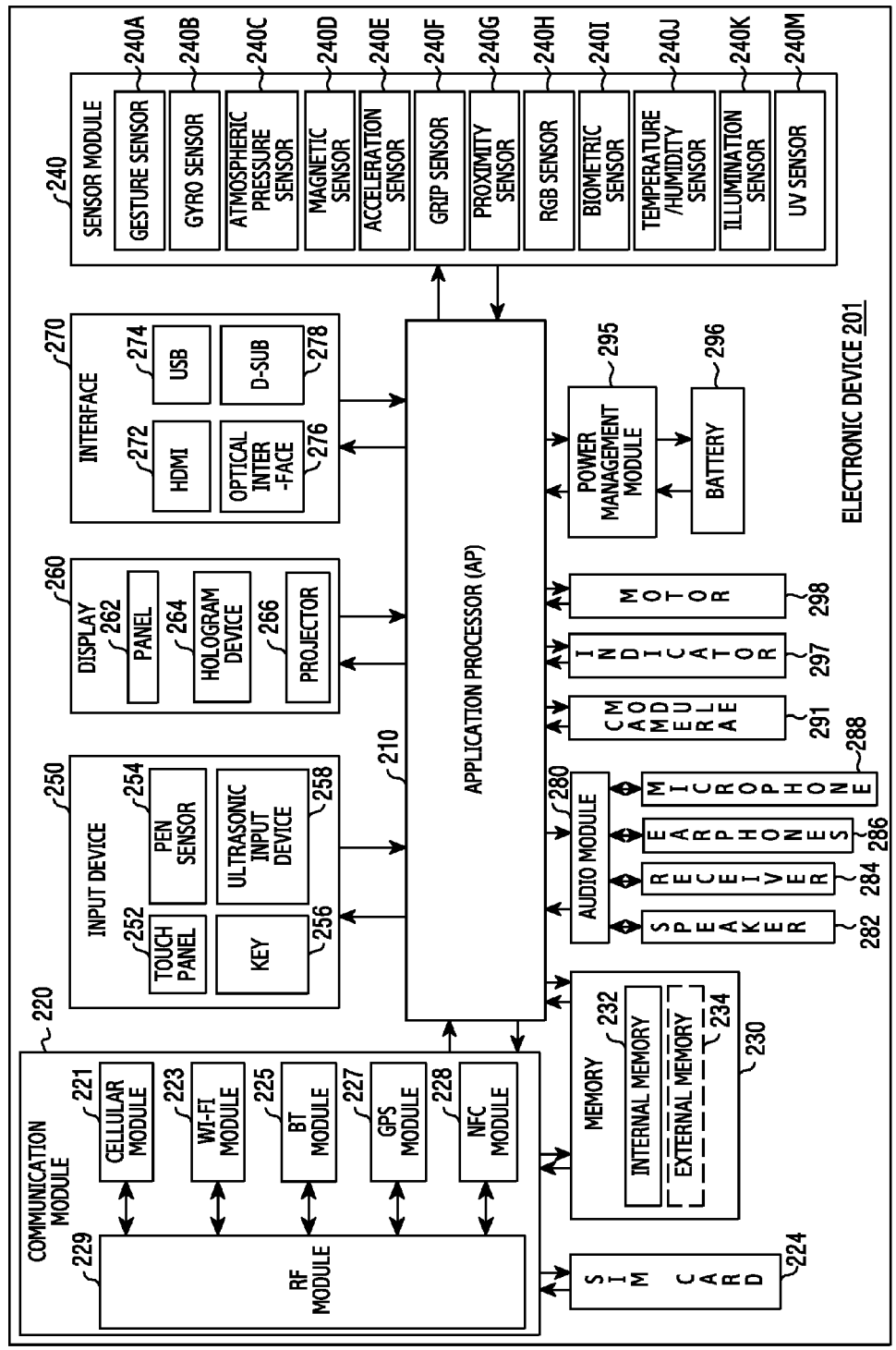
FIG. 2 is a block diagram of an example of an electronic device, according to various embodiments of the present disclosure.

FIG. 2 is a block diagram of an example of an electronic device, according to various embodiments of the present disclosure.

The electronic device 201 may constitute, for example, the entirety or a part of the electronic device 101 illustrated in FIG. 1, or may expand all or some elements of the electronic device 101. Referring to FIG. 2, the electronic device 201 may include at least one processor 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, or a motor 298.

At least one processor 210 may be included in the electronic device 101 to perform a specified function of the electronic device 101. According to an embodiment, the processor 210 may include one or more application processors (APs) and one or more microcontroller units (MCUs). According to another embodiment, the processor 210 may include one or more microcontroller units as applications, or may be functionally connected to one or more microcontroller units. In FIG. 2, the APs and the MCUs may be included in one IC package, or may be separately configured to be included in different IC packages, respectively. According to an embodiment, the MCUs may be included in an IC package of the APs to be configured as one IC package together with the APs. Although the processor 210 is illustrated as including the APs or the MCUs as elements thereof, it is nothing more than an embodiment for clear understanding, and it is apparent that the processor 210 may also perform the operations of the APs and/or the MCUs.

The APs may control a plurality of hardware or software elements connected thereto and perform processing and operations on various types of data including multimedia data by driving an operating system or application programs (or applications). The APs may be embodied as, for example, a System on Chip (SoC). According to an embodiment, the processor 210 may further include a graphic processing unit (GPU, not illustrated).

The MCUs may be processors configured to perform specified operations. According to an embodiment, the MCUs may acquire sensing information through one or more specified motion sensors (e.g., a gyro sensor 240B, an acceleration sensor 240E, or a geomagnetic sensor (not illustrated)), compare the acquired sensing information, and determine the respective operating states of the specified sensors (e.g., a geomagnetic sensor) with reference to a database of the electronic device 201. In addition, although the MCUs and the elements of the sensor module 240 are illustrated as separate elements in FIG. 2, the MCUs may be implemented to include at least some elements of the aforementioned sensor module 240 (e.g., at least one of the gyro sensor 240B, the acceleration sensor 240E, and the geomagnetic sensor) according to an embodiment.

According to an embodiment, the APs or the MCUs may load instructions or data received from at least one of non-volatile memories or other elements connected thereto in volatile memories, and may process the loaded instructions or data. Furthermore, the APs or the MCUs may store data received from or generated by at least one of the other elements in non-volatile memories.

The communication module 220 (e.g., the communication interface 160) may perform data transmission/reception in communication between the electronic device 101 and other electronic devices (e.g., the electronic device 102 or 104, or the server 106) connected thereto through a network. According to an embodiment, the communication module 220 may include a cellular module 221, a Wi-Fi module 223, a BT module 225, a GPS module 227, an NFC module 228, and a Radio Frequency (RF) module 229.

The cellular module 221 may provide a voice call service, a video call service, a text message service, or an Internet service through a communication network (e.g., Long Term Evolution (LTE), LTE-A, Code Division Multiple Access (CDMA), Wideband CDMA (WCDMA), Universal Mobile Telecommunication System (UMTS), Wireless Broadband (WiBro), or Global System for Mobile communication (GSM)). Furthermore, the cellular module 221 may, for example, distinguish between and authenticate electronic devices within a communication network using a subscriber identification module (e.g., the SIM card 224). According to an embodiment, the cellular module 221 may perform at least some of the functions that the AP 210 may provide. For example, the cellular module 221 may perform at least some of the multimedia control functions.

According to an embodiment of the present disclosure, the cellular module 221 may include a communication processor (CP). Furthermore, the cellular module 221 may be embodied as, for example, an SoC. Although the elements such as the cellular module 221 (e.g., a communication processor), the memory 230, and the power management module 295 are illustrated to be separate from the AP 210 in FIG. 2, the AP 210 may be implemented to include at least some of the aforementioned elements (e.g., the cellular module 221) according to an embodiment.

According to an embodiment, the AP 210 or the cellular module 221 (e.g., the communication processor) may load instructions or data received from at least one of non-volatile memories or other elements connected thereto in volatile memories, and may process the loaded instructions or data. Furthermore, the AP 210 or the cellular module 221 may store data received from or generated by at least one of the other elements in a non-volatile memory.

The Wi-Fi module 223, the BT module 225, the GPS module 227, and the NFC module 228 may include a processor for processing data transmitted/received through the corresponding module. In FIG. 2, the cellular module 221, the Wi-Fi module 223, the BT module 225, the GPS module 227, and the NFC module 228 are illustrated as separate blocks. However, according to an embodiment, at least some (e.g., two or more) of the cellular module 221, the Wi-Fi module 223, the BT module 225, the GPS module 227, and the NFC module 228 may be included in one integrated chip (IC) or one IC package. For example, at least some of the processors corresponding to the cellular module 221, the Wi-Fi module 223, the BT module 225, the GPS module 227, and the NFC module 228 (e.g., a communication processor corresponding to the cellular module 221 and a Wi-Fi processor corresponding to the Wi-Fi module 223) may be implemented as one SoC.

The RF module 229 may transmit/receive data, for example, RF signals. Although not illustrated, the RF module 229 may, for example, include a transceiver, a power amp module (PAM), a frequency filter, a low noise amplifier (LNA), or the like. In addition, the RF module 229 may further include an element for transmitting/receiving electronic waves over free air space in wireless communication, such as, a conductor, a conducting wire, or the like. In FIG. 2, the cellular module 221, the Wi-Fi module 223, the BT module 225, the GPS module 227, and the NFC module 228 share one RF module 229. However, according to an embodiment, at least one of them may transmit/receive an RF signal through a separate RF module.

The SIM card 224 may be a card that includes a subscriber identification module, and may be inserted into a slot formed in a specific location of the electronic device. The SIM card 224 may include unique identification information (e.g., an integrated circuit card identifier (ICCID)) or subscriber information (e.g., an international mobile subscriber identity (IMSI)).

The memory 230 (e.g., the memory 130) may include an internal memory 232 or an external memory 234. The internal memory 232 may include at least one of, for example, a volatile memory (e.g., a dynamic random access memory (DRAM), a static RAM (SRAM), a synchronous dynamic RAM (SDRAM), or the like) or a non-volatile memory (e.g., a One Time Programmable Read Only Memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, or the like).

According to an embodiment, the internal memory 232 may be a solid state drive (SSD). The external memory 234 may further include a flash drive, for example, a compact flash (CF), a secure digital (SD), a micro secure digital (Micro-SD), a mini secure digital (Mini-SD), an extreme digital (xD), a Memory Stick, or the like. The external memory 234 may be functionally connected to the electronic device 201 through various interfaces. According to an embodiment, the electronic device 201 may further include a storage device (or storage medium) such as a hard disc drive.

The sensor module 240 may measure a physical quantity or sense the operating state of the electronic device 201 and convert the measured or sensed information into an electric signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, an illumination sensor 240K, and a Ultra Violet (UV) sensor 240M. Additionally or alternatively, the sensor module 240 may include, for example, an E-nose sensor (not illustrated), an electromyography (EMG) sensor (not illustrated), an electroencephalogram (EEG) sensor (not illustrated), an electrocardiogram (ECG) sensor (not illustrated), an infrared (IR) sensor (not illustrated), an iris sensor (not illustrated), a fingerprint sensor (not illustrated), and the like. The sensor module 240 may further include a control circuit for controlling one or more sensors included therein.

The input device 250 may include a touch panel 252, a (digital) pen sensor 254, a key 256, or an ultrasonic input device 258. The touch panel 252 may detect a touch input using at least one of, for example, a capacitive type, a resistive type, an infrared type, and an acoustic wave type. Furthermore, the touch panel 252 may further include a control circuit. In the case of the capacitive type touch panel, physical contact or proximity detection is possible. The touch panel 252 may further include a tactile layer. In this case, the touch panel 252 may provide a user with a tactile reaction.

The (digital) pen sensor 254 may be implemented, for example, using the same or a similar method to receiving a user's touch input, or using a separate sheet for detection. The key 256 may include, for example, a physical button, an optical key, or a keypad. The ultrasonic input device 258 may identify data by sensing acoustic waves with the microphone (e.g., a microphone 288) of the electronic device 201 through an input unit used for generating ultrasonic signals and may perform a wireless detection. According to an embodiment, the electronic device 201 may also receive a user input from an external device (e.g., a computer or server) connected thereto using the communication module 220.

The display 260 (e.g., the display 150) may include a panel 262, a hologram device 264, or a projector 266. The panel 262 may be, for example, a liquid crystal display (LCD), an active matrix organic light emitting diode (AM-OLED), or the like. The panel 262 may be implemented to be, for example, flexible, transparent, or wearable. The panel 262 may also be formed as a single module together with the touch panel 252. The hologram device 264 may show a three-dimensional image in the air by using interference of light. The projector 266 may display an image by projecting light onto a screen. The screen may be located, for example, in the interior of or on the exterior of the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included in, for example, the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may bilaterally convert a sound and an electric signal. At least some elements of the audio module 280 may be included in, for example, the input/output interface 140 illustrated in FIG. 1. The audio module 280 may process voice information input or output through, for example, a speaker 282, a receiver 284, earphones 286, or the microphone 288.

The camera module 291, which is a device for capturing both still and moving images, may include one or more image sensors (e.g., a front sensor or a rear sensor), a lens (not illustrated), an image signal processor (ISP, not illustrated), or a flash (e.g., an LED or a xenon lamp, not illustrated) according to an embodiment.

The power management module 295 may manage the power of the electronic device 201. Although not illustrated, the power management module 295 may include, for example, a power management integrated circuit (PMIC), a charger integrated circuit (IC), or a battery or fuel gauge. According to various embodiments, the PMIC may be mounted in an integrated circuit or an SoC semiconductor. Charging methods may be classified into wired charging and wireless charging. The charger IC may charge a battery and may prevent an overvoltage or excess current from being introduced from a charger.

According to an embodiment, the charger IC may include a charger IC for at least one of the wired charging and the wireless charging. Examples of the wireless charging may include magnetic resonance charging, magnetic induction charging, and electromagnetic charging, and an additional circuit for wireless charging, for example, a coil loop, a resonance circuit, a rectifier or the like may be added.

The battery gauge may measure, for example, a residual quantity of the battery 296, and a voltage, a current, or a temperature while charging. The battery 296 may store or generate electricity and supply power to the electronic device 201 using the stored or generated electricity. The battery 296 may include, for example, a rechargeable battery or a solar battery.

The indicator 297 may indicate a specific state of the electronic device 201 or a part thereof (e.g., the AP 210), for example, a boot-up state, a message state, or a state of charge (SOC). A motor 298 may convert an electric signal into a mechanical vibration. Although not illustrated, the electronic device 201 may include a processing device (e.g., a GPU) for mobile TV support. The processing unit for mobile TV support may process, for example, media data pursuant to a certain standard of Digital Multimedia Broadcasting (DMB), Digital Video Broadcasting (DVB), or media flow.

Each of the above-described elements of the electronic device according to various embodiments of the present disclosure may include one or more components, and the name of a corresponding element may vary according to the type of electronic device. The electronic device according to various embodiments of the present disclosure may include at least one of the above-described elements and may exclude some of the elements or further include other additional elements. Further, some of the elements of the electronic device according to various embodiments of the present disclosure may be coupled to form a single entity while performing the same functions as those of the corresponding elements before the coupling.

According to the various embodiments of the present disclosure, an electronic device may include: a communication interface configured to establish wireless communication with the other electronic device; a memory; and a processor electrically connected with the memory and the communication interface, wherein the processor is configured to execute: sensing a change of state of the electronic device; transmitting first information associated with the change of state to the other electronic device using the communication interface; receiving second information associated with the control of the electronic device from the other electronic device by using the communication interface; and performing a process of the electronic device using the second information. According to the various embodiments, the change of state may include an event received from the outside, a use event of the electronic device, or a user's state change in the electronic device.

According to the various embodiments, the processor may be configured to execute: identifying users of the electronic device and the other electronic device when sensing the change of state of the electronic device; and providing an event generated by the electronic device to the other electronic device when the users of the electronic devices differ from each other. According to the various embodiments, when the users of the electronic devices differ from each other, the processor may be configured to omit the output of an event corresponding to a call, a message, or an application notification that is received from the outside and transfer the corresponding event to the other electronic device.

According to various embodiments, the processor may be configured to determine that the users of the electronic devices differ from each other when a specific mode is configured to restrict the use of the electronic device. According to various embodiments, the processor may be configured to determine whether the users of the electronic devices are the same as each other on the basis of the distance between the electronic device and the other electronic device. According to various embodiments, the processor may be configured to notify the other electronic device of information relating to an event in which the electronic device is used when the users of the electronic devices differ from each other.

According to various embodiments, the processor may be configured to acquire the wearing information of the other electronic device from the other electronic device through the communication interface and determine the wearing state of the other electronic device on the basis of the acquired wearing information.

According to various embodiments, the processor may be configured to execute a push to talk (PTT) function in response to a request from the other electronic device or a user input and process data transmission or reception according to the execution of the PTT function through the communication interface. According to various embodiments, the processor may be configured to process the data in real time or in a predetermined time unit (e.g., on a configured time) basis to correspond to a connection state between the electronic device and the other electronic device when executing the PTT function. According to various embodiments, the processor may be configured to execute the PTT function on the basis of a signal configured between the electronic device and the other electronic device to correspond to the connection state.

According to various embodiments, the processor is configured to execute: backing up at least a part of a user interface, data, and setting information of the electronic device when sensing the use event of the electronic device; and recovering the electronic device on the basis of the backup in response to the control of the other electronic device or release of the use event of the electronic device.

According to various embodiments, the processor is configured to execute: sensing the user's change of state from at least one electrically connected sensor; determining whether the change of state is included in a preset reference; and transmitting information corresponding to the change of state to the other electronic device when the change of state is included in the preset reference.

In the following descriptions of various embodiments, electronic devices may be distinguished into a first electronic device (e.g., the electronic device 101) and a second electronic device (e.g., the electronic device 102, 103, or 104), and operations thereof will be described individually. The distinction is only for a clear explanation of the embodiments, and the first electronic device 101 and the second electronic device 102 may be the same device, or different devices. In the following various embodiments, a smart phone or a tablet PC may be described as a representative example of the first electronic device 101, and a wearable device (e.g., a smart watch that may be worn on a user's body part) may be described as a representative example of the second electronic device 102. However, it is only for a clear explanation of the various embodiments of the present disclosure, and the first electronic device may also be a wearable device and the second electronic device may also be a smart phone. Furthermore, the first and second electronic devices 101, 102 may also be smart phones or wearable devices. In addition, the first electronic device 101 and/or the second electronic device 102 is not limited to the smart phones or the wearable devices, and various types of devices capable of transmitting/receiving data through a network communication connection between two devices may be employed for the first and second electronic devices.

Figure 3A:
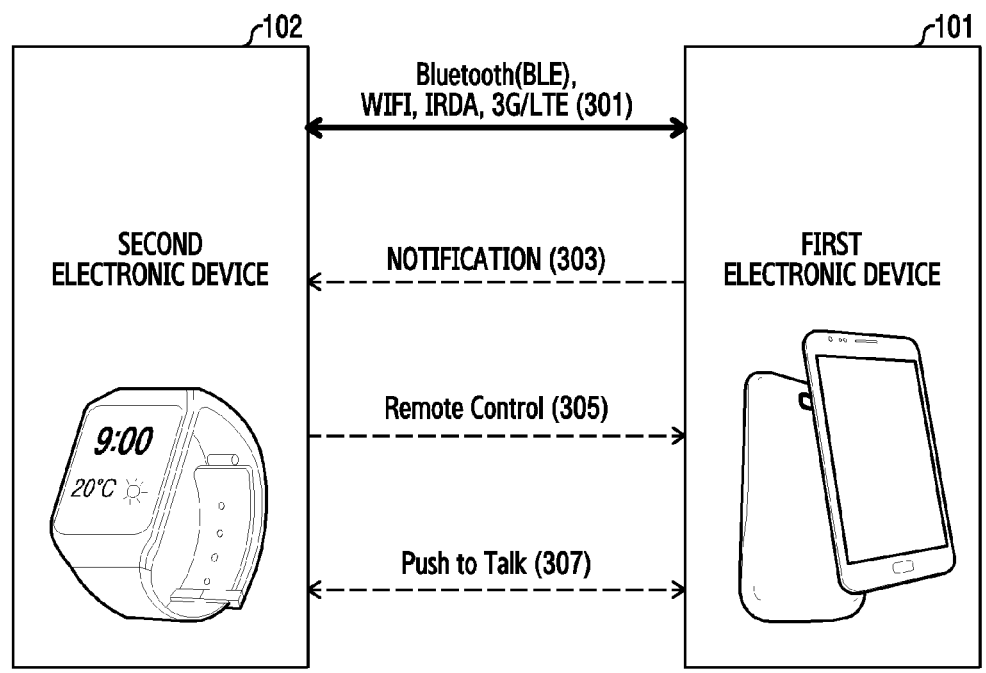
FIG. 3A is a sequence diagram illustrating an example of a communication exchange between two electronic devices, according to various embodiments of the present disclosure.

FIG. 3A is a sequence diagram illustrating an example of a communication exchange between two electronic devices, according to various embodiments of the present disclosure.

As illustrated in FIG. 3A, it will be exemplified that the first electronic device 101 is a smart phone and the second electronic device 102 is a wearable device; however, the present disclosure is not limited thereto. According to an embodiment of FIG. 3A, the second electronic device 102 may be worn by a manager (e.g., a parent), and the first electronic device 101 may be operated by a specific user (e.g., a child). According to another embodiment of FIG. 3A, the second electronic device 102 may be worn by a specific user (e.g., a child), and the first electronic device 101 may be operated by a manager (e.g., a parent).

Referring to FIG. 3A, in operation 301, the first electronic device 101 and the second electronic device 102 may interwork with each other. The first and second electronic devices 101, 102 may be connected to each other through a preset communication method within a predetermined coverage area corresponding to the communication method. For example, the first and second electronic devices may be connected via a short-range connection, such as a Bluetooth connection having a range of about 10 m. According to various embodiments, the first and second electronic devices 101, 102 may be connected to each other based on various communication methods, such as Bluetooth, Bluetooth low energy (BLE), Wi-Fi, infrared data association (IrDA), 3G/LTE, ultra wideband (UWB), near field communication (NFC), etc. In various embodiments, in instances in which the first and second electronic devices 101, 102 are interconnected and exist in the predetermined coverage area according to the corresponding communication method, the first electronic device 101 may be controlled through the second electronic device 102. However, in instances in which the first electronic device 101 is beyond the predetermined coverage area, the first electronic device 101 may not be under the control of the second electronic device 102, and vice versa.

According to various embodiments, while the first and second electronic device 101, 102 interwork with each other, various functions (e.g., a notification function, a remote control function, and a push to talk (PTT) function) may be performed differently in a specific mode (e.g., a "kids" mode) according to whether the first electronic device 101 is used by a manager (e.g., a parent) or a specific user (e.g., a child).

Hereinafter, an example in which a manager (e.g., a parent) uses the second electronic device 102 and a specific counterpart (e.g., a child) uses the first electronic device 101 will be described with reference to FIG. 3A.

In operation 303, the first electronic device 101 may notify the second electronic device 102 of various pieces of information relating to the first electronic device 101. In some instances, a specific mode (e.g., a "kids" mode) may be configured for the first electronic device 101 according to the manipulation of the second or first electronic device 102 or 101.

For example, the first electronic device 101, while being connected to the second electronic device 102, may detect the use (or stop) of the first electronic device 101 or a preset input that is received at the first electronic device 101 (e.g., a face image, a touch input, a change in the posture or movement of the second electronic device 102, etc.) or may monitor the state of the first electronic device 101, and may transmit, to the second electronic device 102, information corresponding to that. For example, the first electronic device 101 may transmit, to the second electronic device 102, forwarding information for forwarding manipulation notification information according to the initiation or termination of use of the first electronic device 101, state information according to monitoring, and an event received from the outside (e.g., a call, a message, an application notification, etc.). In various embodiments, the notification operation will be described in detail further below.

In operation 305, the second electronic device 102 may transmit the first electronic device 101 a control signal for acquiring remote control over the first electronic device 101.

According to an embodiment, the second electronic device 102 may transmit a control signal for controlling the initiation or termination of a specific mode (e.g., a "kids" mode) to the first electronic device 101 in response to the notification of the first electronic device 101 for the use or stop (termination) thereof. According to another embodiment, the second electronic device 102 may transmit a control signal relating to an input/output function control or a recovery mode control over the first electronic device 101 to the first electronic device 101 in response to the notification of the first electronic device 101 for the state information thereof. In various embodiments, the remote control operation will be described in detail further below.

Hereinafter, a second case where a specific party (e.g., a child) uses the second electronic device 102 and a manager (e.g., a parent) uses the first electronic device 101 will be described with reference to FIG. 3A.

In operation 303, the first electronic device 101 may notify the second electronic device 102 of various pieces of information relating to the first electronic device 101. For instance, a specific mode (e.g., a missing-child prevention mode) may be configured for the second electronic device 102 according to the manipulation of the second or first electronic device 102 or 101.

For example, the first electronic device 101, while being connected to the second electronic device 102, may transmit various pieces of information relating to operations of the second electronic device 102 to the second electronic device 102 in response to a control of a user (e.g., the user of the first electronic device 101). According to an embodiment, the first electronic device 101 may notify the second electronic device 102 of a notification or setting information relating to a missing-child prevention function, a physical condition check information relating to the user (e.g., a child) of the second electronic device 102, notification or setting information relating to monitoring an emergency of the user (e.g., a child) of the second electronic device 102, and the like. According to an embodiment, the first electronic device 101 may provide the second electronic device 102 with reference information (e.g., the distance or signal strength between the first and second electronic devices 101, 102) in response to a predetermined function being activated on the first electronic device (e.g., a missing-child prevention function). According to another embodiment, the first electronic device 101 may provide the second electronic device 102 with various pieces of information associated with the physical condition of the user (e.g., a child) of the second electronic device 102 (e.g., indications of physiological parameters, such as heart rate, body temperature, etc.). According to yet another embodiment, the first electronic device 101 may provide the second electronic device 102 with setting information (e.g., a check on a heart rate or movement) for monitoring various emergencies (e.g., waking up or crying) of the user (e.g., a child) of the second electronic device 102. In various embodiments, the notification operation will be described in detail further below.

In operation 305, the second electronic device 102 may transmit a control signal for the remote control of the first electronic device 101 to the first electronic device 101.

According to an embodiment, the second electronic device 102 may transmit setting information relating to emergency mode setup of the first electronic device 101 to the first electronic device 101. According to another embodiment, the second electronic device 102 may transmit the emergency state information associated with the user (e.g., a child) of the second electronic device 102 to the user (e.g., a parent) of the first electronic device 101. In various embodiments, the remote control operation will be described in detail with reference to drawings to be described below.

In the first or second case described above, the first and second electronic devices 101, 102 may transmit/receive data according to a PTT function (Operation 307). According to an embodiment, the first and second electronic devices 101, 102 may exchange voice and image information using the PTT function. For example, the first and second electronic devices 101, 102 may provide a voice call, a video call, or a data call (e.g., text to speech (TTS)) and process data transmission/reception according to that. In various embodiments, the PPT operation will be described in detail with reference to drawings to be described below.

Figure 3B:
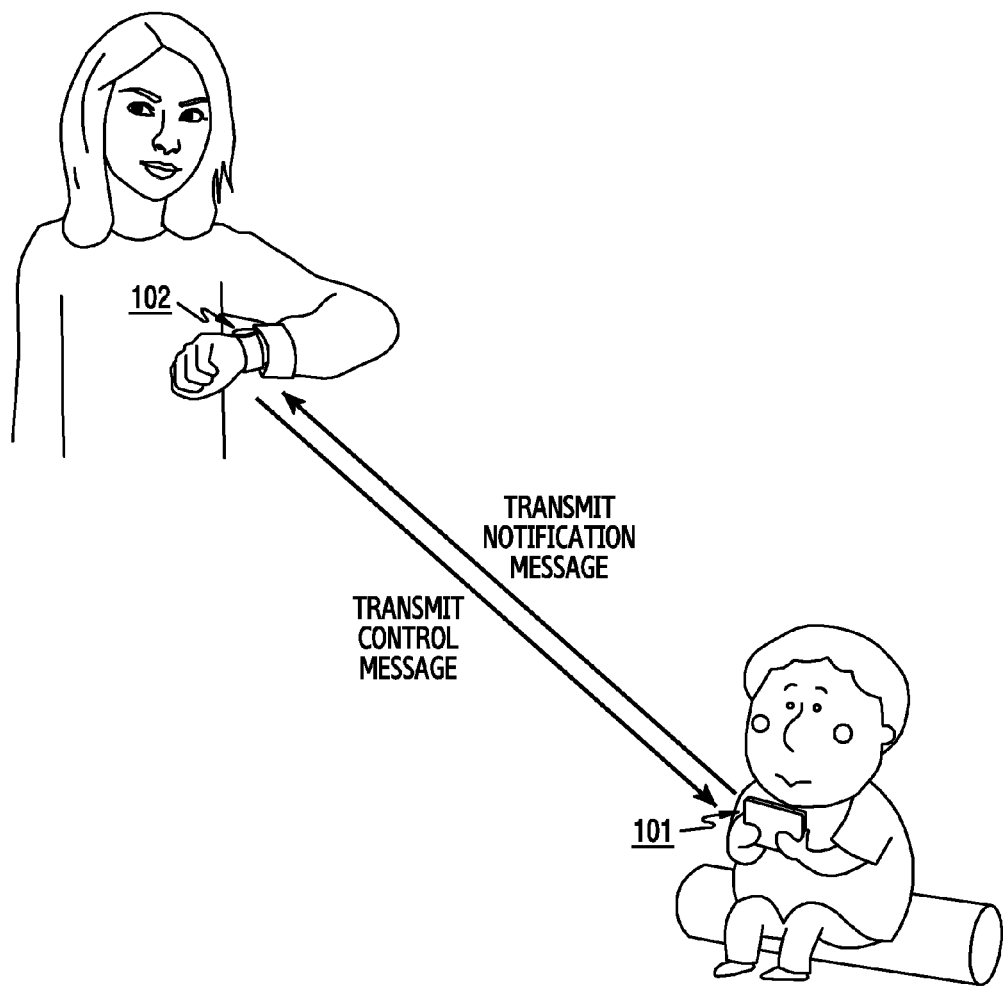
FIG. 3B is a diagram illustrating an example of the operation of a pair of electronic devices, according to various embodiments of the present disclosure.

FIG. 3B is a diagram illustrating an example of the operation of a pair of electronic devices, according to various embodiments of the present disclosure.

According to various embodiments, the first electronic device 101 may be connected to the second electronic device 102 (or another electronic device (e.g., the electronic device 102, 103, or 104)) through network communication. For example, the first and second electronic devices 101, 102 may be connected to each other through a short-range communications protocol, such as a Bluetooth. The first electronic device 101 may detect a situation where the first electronic device 101 has been activated (or started to be used) on the basis of detection information and transmit a notification message for notifying the second electronic device 102 that the first electronic device 101 has been activated.

According to various embodiments, in instances in which the first electronic device 101 is transitioned from a standby state (off state of the display 150) to an activated state (e.g., on state of the display 150), the first electronic device 101 may transmit, to the second electronic device 102, a message indicating that the first electronic device 101 has been released from the standby state. In addition, the first electronic device 101 may acquire various pieces of state information generated in the first electronic device 101 to determine the activated state of the first electronic device 101 without being limited to determining the activated state of the first electronic device 101 depending on the on/off state of the display 150.

According to an embodiment, the first electronic device 101 may determine a situation in which the first electronic device 101 is being used (e.g., has been activated) by a user on the basis of information acquired through at least one sensor included therein. For example, the first electronic device 101 may detect a situation in which the first electronic device 101 is being used on the basis of information detected through a sensor, such as the gyro sensor 240B or the acceleration sensor 240E, for detecting the motion of the first electronic device 101 in the on state of the display 150.

According to an embodiment, the first electronic device 101 may detect a situation in which the first electronic device 101 is being used to perform an operation on the basis of information acquired through the grip sensor 240F and/or the biometric sensor 240I with which a user's body part makes contact, without being limited to the determining of the situation where the first electronic device 101 is being used to perform an operation on the basis of the motion information of the first electronic device 101 acquired through the gyro sensor 240B and/or the acceleration sensor 240E.

According to an embodiment, in instances in which the first electronic device 101 includes a camera (e.g., the camera module 291 of FIG. 2), if a user's face is detected through the camera, the first electronic device 101 may detect a situation in which the first electronic device 101 is being used. For example, when a child's face is detected through a front camera of the first electronic device 101, it may be determined that the first electronic device 101 is being used. In various embodiments, face information (e.g., the child's face image) for the operation may be stored in the memory (e.g., the memory 230 of FIG. 2) of the first electronic device 101, and an operation of comparing a face image acquired through the camera with a pre-registered face image may be further performed.

In various embodiments, in instances in which the first electronic device 101 determines the user's face image acquired through the camera to be a specific user's face image specified in setting information (e.g., face information), the first electronic device 101 may change the operating state of the first electronic device 101 which is configured to correspond to the specific user's face (e.g., may call a specified mode or change to a specified mode). For example, the first electronic device 101 may register the specific user's image through the setting information, and when identifying the specific user on the basis of an image taken through the camera, the first electronic device 101 may call a "kids" mode which is specified to correspond to the specific user (or change to the "kids" mode). According to an embodiment, the first electronic device 101 may also call a guest mode (or change to a guest mode) when the user's image taken through the camera is determined to be an image of a user who is not registered as a specific user in the setting information. When a standby state is released, the first electronic device 101 may acquire an image through the camera, and when determining whether the acquired image is included in a specific user's pre-registered face image, the first electronic device 101 may transition into a specific mode (e.g., a "kids" mode, a guest mode, or a user restriction mode).

According to an embodiment, the first electronic device 101 may determine that the first electronic device 101 is being used on the basis of a user input detected through a touch panel or a button included in (or interworking with) the display 150. For example, the first electronic device 101 may include a touch screen, determine an area where a touch is sensed through the touch screen, and determine whether the first electronic device 101 is used on the determination result. According to an embodiment, reference area information for determining whether the first electronic device 101 is used (e.g., touch area information configured according to a manager's (e.g., a parent's) finger touch) may be pre-stored in a memory (e.g., the memory 230 of FIG. 2), and the first electronic device 101 may compare the area of a touch sensed through the touch screen (e.g., an area according to a child's finger touch) with the pre-stored reference area to determine whether the first electronic device 101 is used. According to an embodiment, when an area where a touch is sensed (e.g., an area where the child touches with his/her finger) is smaller than the reference area (e.g., an area where the manager touches with his/her finger), the first electronic device 101 may determine that the first electronic device 101 is being used.

According to various embodiments, the on state of the display 150 is one of the conditions for determining the activated state of the first electronic device 101, and the display 150 must not necessarily be active during the determination of the activated state of the first electronic device 101.

The first electronic device 101 may determine that the first electronic device 101 is being used based on a combination of two or more of the various conditions. According to various embodiments, when the electronic device 101 is released from a standby state and operates in a specific mode, the first electronic device 101 may make the determination on the basis of various pieces of information acquired thereby, without being limited to making the determination on the image acquired through the camera as described above. According to an embodiment, the first electronic device 101 may determine a user on the basis of information acquired through a biometric sensor, such as a pulse detection sensor, an iris recognition sensor, or a fingerprint recognition sensor, included in the first electronic device 101 and may operate in a specific mode to correspond to the user.

According to the above description, although it has been described that the notification message is transmitted to the second electronic device 102 when the first electronic device 101 is changed from the standby state to the activated state, the present disclosure is not limited thereto, and when it is identified that the user of the first electronic device 101 is changed, for example, when it is identified that a specific user uses the first electronic device 101, a notification message identifying an operation specified associated with the specific user may be transmitted to the second electronic device 102. In the following description, the first electronic device 101 may transmit a notification message in response a variety of conditions, such as identifying the use of a specific user, without restricting the condition for transmitting a notification message to a specific electronic device (e.g., the second electronic device 102) to the activation of the first electronic device 101 from the standby state.

In addition, although the above example is provided in the context of a "kids" mode, any other suitable mode (e.g., a guest mode or a user restriction mode) may be used instead.

According to various embodiments, in instances in which the first electronic device 101 determines that the first electronic device 101 is being used, the first electronic device 101 may transmit information (e.g., a notification message) for the situation in which the first electronic device 101 is being used by at least one specific electronic device (e.g., the second electronic device 102) connected thereto through network communication. For example, the first electronic device 101 may transmit a notification message for informing that the use of the first electronic device 101 has been initiated to the second electronic device 102 in response to the detection of the changed situation of the first electronic device 101 (e.g., termination of a standby state and conversion to an activated state).

According to various embodiments, the first electronic device 101 may acquire information associated with an operation occurring after the termination of a standby state (e.g., after the conversion to an activated state) and transmit the acquired information to the second electronic device 102.

According to various embodiments, the first electronic device 101 may monitor the manner in which a specific user (e.g., a child) is using the first electronic device 101 and provide the monitoring results to the second electronic device 102. The monitoring may include monitoring, by a user (e.g., a child) of the second electronic device 102, information associated with content (e.g., music, videos, photos) being reproduced in the second electronic device 102, information associated with applications being used in the second electronic device 102, information associated with operating time of the applications being used in the second electronic device 102, information associated with a total time spent by the user using the second electronic device 102, captured screen images being used in the second electronic device 102, information associated with a battery residual quantity of the second electronic device 102, and the like. For example, the first electronic device 101 may acquire information associated with a called program or a running program, a time interval during which the electronic device 101 operates in an activated state, and information such as changed (e.g., moved or deleted) program or content to create notification messages corresponding thereto. The first electronic device 101 may transmit the created notification messages to the second electronic device 102.

In various embodiments, the second electronic device 102 may receive a notification message from the first electronic device 101 and transmit a control message corresponding to the notification message or a control message corresponding to a user input to the first electronic device 101. The second electronic device 102 may display a screen relating to the notification message in response to the receipt of the notification message. The first electronic device 101 may receive the control message corresponding to the transmitted notification message from the second electronic device 102 and perform an operation based on control information that is contained in the control message.

According to various embodiments, when transmitting a message for informing that a standby state has been released (or the first electronic device 101 has been activated) to the second electronic device 102, the first electronic device 101 may perform the transmission when a condition specified based on setting information of the first electronic device 101 is satisfied. According to an embodiment, the first electronic device 101 may be configured to transmit the message for informing of the activated state in instances in which the distance from the second electronic device 102 is a specified distance or more on the basis of location information.

For example, when it is detected that the standby state has been released, the first electronic device 101 may acquire the location information of the first electronic device 101 and the location information of the second electronic device 102. When it is determined that the distance from the second electronic device 102 is larger than a distance specified in the setting information, the first electronic device 101 may transmit the message for informing the second electronic device 102 of the activated state. Furthermore, when it is determined that the distance from the second electronic device 102 is smaller than the distance specified in the setting information, the first electronic device 101 may refrain from transmitting the message for informing the second electronic device 102 of the activated state.

According to various embodiments, it may be assumed that the first electronic device 101 is held by a first user (e.g., a child) and exists in a first position (in a first space) (e.g., a room) so as to be adjacent to the first user, and the second electronic device 102 exists at a second position (in a second space) (e.g., a living room or a kitchen outside the room) which is different from the first position (the first space) while being worn by a second user (e.g., a manager or parent). In such instances, the first electronic device 101 may sense the release of the standby state (e.g., conversion to the activated state) through a situation recognition operation under a set condition. For example, the first electronic device 101 may detect the release of the standby state through situation recognition such as detecting a touch input by the first user, detecting a change in the posture or movement of the first electronic device 101, detecting sounds of a predetermined magnitude or more around the first electronic device 101, or the like.

When detecting the release of the standby state (conversion to the activated state), the first electronic device 101 may take an image of the first user, who has activated the first electronic device 101, through a camera thereof (e.g., a front camera or a rear camera thereof). For example, the camera of the first electronic device 101 may be turned on (driven) at the time of activation of the first electronic device 101, or may always stand by in an on state according to the setup of the first electronic device 101.

The first electronic device 101 may operate a "kids" mode on the basis of the acquired image of the first user and setting information configured in advance in the first electronic device 101 (e.g., a pre-registered face image for the first user). For example, the first electronic device 101 may compare the acquired face image of the first user with the preset face image to determine whether the images are in agreement with each other. In various embodiments, when the determination result shows that the images agree with each other, the electronic device 101 may execute a preset mode (e.g., a "kids" mode). In various embodiments, when the determination result shows that the images are different from another, the electronic device 101 may execute another set mode (e.g., a guest mode).

In instances in which the first electronic device 101 operates in the "kids" mode, the first electronic device 101 may acquire the position of the first electronic device 101 and the position of the second electronic device 102. The first electronic device 101 may determine (calculate) the distance between the first and second electronic devices 101, 102 on the basis of the acquired position information. According to an embodiment, the first electronic device 101 may identify the distance (e.g., 5 meters) between itself and the second electronic device 102 with respect to the position of the first electronic device 101. The first electronic device 101 may compare setting information (e.g., preset reference distance information) with the identified distance between the first and second electronic devices 101, 102.

In various embodiments, in cases in which the identified distance between the first and second electronic devices 101, 102 is larger than the distance configured in the first electronic device 101, the first electronic device 101 may transmit a notification of the activated state to the second electronic device 102. In various embodiments, in cases in which the identified distance between the first and second electronic devices 101, 102 is smaller than the distance configured in the first electronic device 101, the first electronic device 101 may refrain from transmitting an indication of the activated state to the second electronic device 102. According to various embodiments, in cases in which the standby state is released, the first electronic device 101, when determining whether to transmit the notification of the activated state to the second electronic device 102, may make the determination on the basis of the signal strength (e.g., RSSI) of the network communication connected between the first and second electronic devices 101, 102, in addition to the distance information of the first and second electronic devices 101, 102. In addition, when transmitting the indication of the activated state to the second electronic device 102, the first electronic device 101 may also make a determination by combining the position information of the first and second electronic devices 101, 102 and the signal strength of the network communication.

According to various embodiments, the first electronic device 101 may transmit various occurring events or information thereon to at least one other electronic device (e.g., the second electronic device 102) connected to the first electronic device 101. For example, the first electronic device 101 may transmit information associated with running programs (or applications) in the first electronic device 101 to the second electronic device 102 at a specified time interval. Or, the first electronic device 101, when detecting an operation of executing (or calling) a new program, may transmit information associated with the executed program to the second electronic device 102.

According to an embodiment, in instances in which the first electronic device 101 detects an attempt to access or purchase a program (e.g., an app) through an online store (e.g., Play store or App store), where a program may be sold, on the basis of a user input, the first electronic device 101 may transmit a notification message for the corresponding contents to the second electronic device 102. In various embodiments, the first electronic device 101 may postpone accessing or purchasing the program until receiving an acknowledgement of the transmitted notification message from the second electronic device 102. The first electronic device 101 may approve/disapprove the access to or the purchase of the program on the basis of the acknowledgement message which is received from the second electronic device 102 in response to the transmitted notification message.

According to various embodiments, in the use of a website, the first electronic device 101, when detecting an attempt to access or use a charged service (e.g., a charged real-time streaming service), for example, when detecting an attempt to pay for a charged service, may transmit a notification message associated with the corresponding contents to the second electronic device 102. The first electronic device 101 may postpone using (or submitting a payment for) the charged service until receiving an acknowledgement of the transmitted notification message from the second electronic device 102. The first electronic device 101 may approve/disapprove the use of the charged service on the basis of the acknowledgement message which is received from the second electronic device 102 in response to the transmitted notification message.

According to various embodiments, in the transmission of the notification message to the second electronic device 102, the first electronic device 101 may provide a menu for determining whether to approve the attempt at accessing or making a payment for the use of the corresponding program or service. The second electronic device 102 may create information for approving or disapproving the use of the program or service according to a user input received through the menu, and may transmit the information to the first electronic device 101.

According to various embodiments, in instances in which it is identified that a program has been used for a specified time or more (e.g., a specific game program or a specific video has been used for an hour or more) after being called, the first electronic device 101 may transmit the corresponding information (e.g., the used program and/or the time of use) to the second electronic device 102.

In various embodiments, the first electronic device 101 is not limited to transmitting information associated with an event occurring in the first electronic device 101 to the second electronic device 102 as described above. For example, the first electronic device 101 may also receive information associated with an event occurring in the first electronic device 101 from another electronic device (e.g., another user's electronic device (e.g., the third electronic device 104, see FIG. 4A) in order to transmit the information to the second electronic device 102. A specific example of this will hereinafter be described with reference to FIGS. 4A and 4B.

Figure 4A:
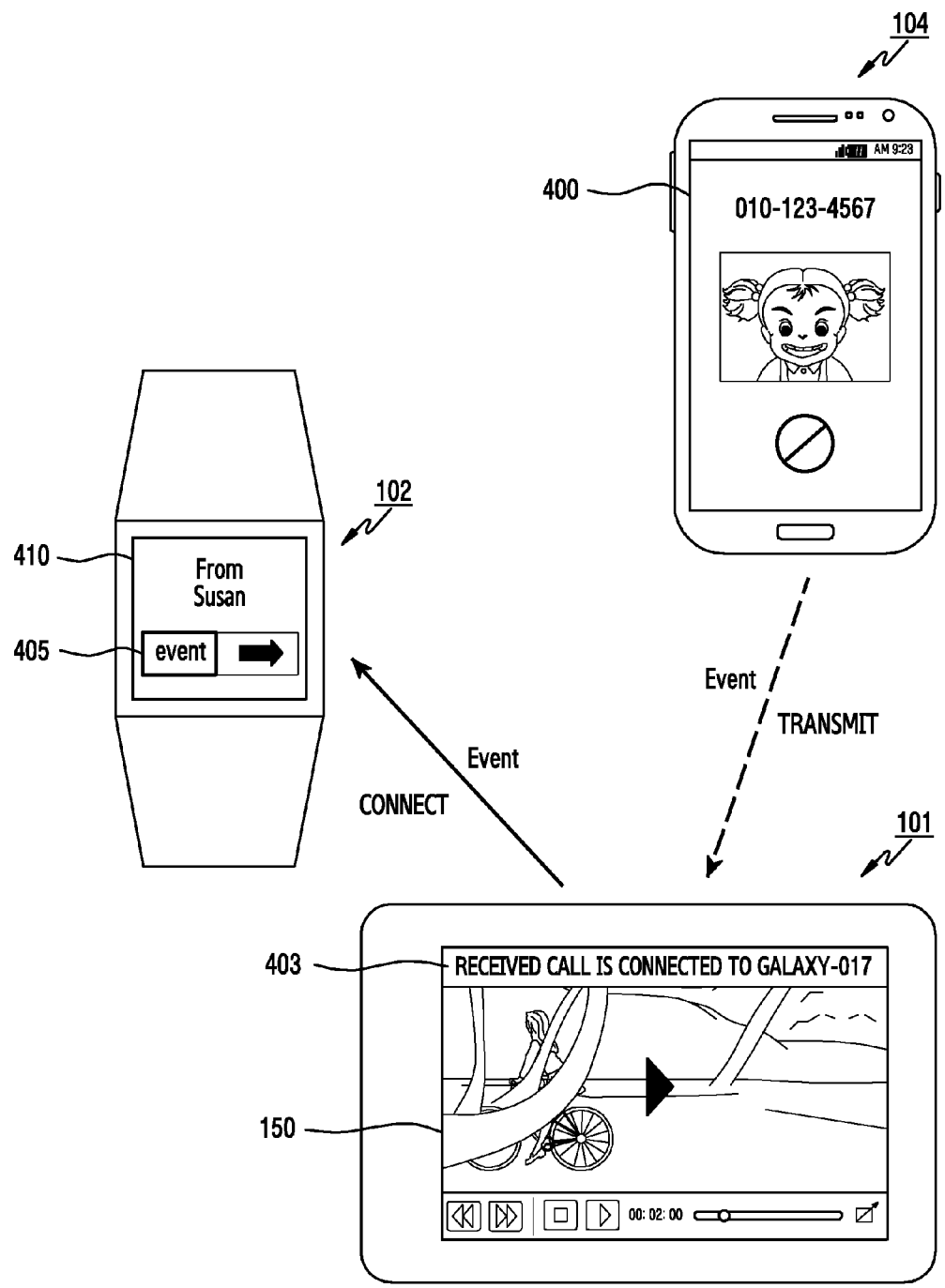
FIG. 4A is a diagram illustrating an example of the operation of a set of electronic devices, according to various embodiments of the present disclosure.

FIG. 4A is a diagram illustrating an example of the operation of a set of electronic devices, according to various embodiments of the present disclosure.

Referring to FIG. 4A, the first electronic device may operate in a "kids" mode. In instances in which the first electronic device 101 operates in the "kids" mode, the first electronic device 101 may transmit an event occurring therein and/or information associated with the event to the second electronic device 102. For example, when a user (e.g., a child) uses the first electronic device 101 in the "kids" mode (e.g., when the user views a video or plays a game), the first electronic device 101 may refrain from processing (e.g., display or notify of) an event (e.g., a call, a message, an application notification, etc.) received from the outside, but may perform a background processing operation to transmit (e.g., forward) the event to the second electronic device 102 connected thereto.

According to an embodiment, the first electronic device 101 may receive a call connection request from the third electronic device 104 of another user. When receiving the call connection request from the third electronic device 104, the first electronic device 101 may determine the current operating state thereof (e.g., the "kids" mode). The first electronic device 101, when operating in the "kids" mode, may refrain from outputting a notification of the received call connection request, and remain in a current operating state (e.g., a state of displaying a screen and outputting a sound according to reproduction of a video, or a state of displaying a screen and outputting a sound according to performance of a game). The first electronic device 101 may perform a background processing operation on the received call connection request to connect (or relay) the request to the specified (connected) second electronic device 102 while being maintained in the current state.

In various embodiments, when connecting (or relaying) the call connection request received from the third electronic device 104 to the second electronic device 102, the first electronic device 101 may refrain from sending a notification message for the reception of the call connection request to the user (e.g., a child) of the first electronic device 101 (e.g., may not display it on the display 150 or may not output it with a ring tone or vibration), but may perform a process such that the notification message is directly connected to the second electronic device 102. For example, when operating in a specific mode (e.g., the "kids" mode), the first electronic device 101 may refrain from outputting indications of various events (e.g., a call, a message, an application notification, etc.) received from the outside (e.g., the third electronic device 104 of the another user) through the first electronic device 101, but may output the received events through the second electronic device 102 in order to prevent the received events from being arbitrarily processed by a user who uses the first electronic device 101 or prevent the first electronic device 101 from being disturbed by the corresponding user. That is, the first electronic device 101 may process the received events or the notification messages in the background and transmit (e.g., forward) them to the second electronic device 102 connected to the first electronic device 101.

The second electronic device 102 may receive an event or a notification message for the event from the first electronic device 101 and process an output (e.g., an output based on display, vibration, sound, etc.) corresponding to the received event or notification message. The second electronic device 102 may receive a user input corresponding to the event or notification message and transmit a control message corresponding to the received user input to the first electronic device 101.

The first electronic device 101, after transmitting the received event or the notification message for the event to the second electronic device 102, may receive a control message corresponding to the event or the notification message from the second electronic device 102. On the basis of the received control message, the first electronic device 101 may process the event received thereby (e.g., may connect the event to the second electronic device 102, or may maintain or terminate the relayed event).

For example, referring to FIG. 4A, the first electronic device 101 may receive an event (e.g., a call connection request) from the third electronic device 104 while operating in the "kids" mode. The first electronic device 101 may forward the event to the second electronic device 102 connected thereto when receiving the event from the external device like the third electronic device 104 while operating in the "kids" mode. That is, the first electronic device 101 may connect (or relay) the event (e.g., the call connection request) received from the outside (e.g., the third electronic device 104) to the second electronic device 102.

The second electronic device 102, when receiving an event forwarded by the first electronic device 101, may display a screen corresponding to the received event. For example, the second electronic device 102 may display a screen including information associated with a counterpart (e.g., the third electronic device 104) that has initiated the event (e.g., a call connection request) and a menu for processing (e.g., approving or rejecting) the event through a display 410 thereof. In various embodiments, the information associated with the counterpart may include, for example, sender information 400 (e.g., 010-123-4567) corresponding to the third electronic device 104 or information (e.g., a name or a nickname (e.g., Susan)) relevant to the sender information in instances in which the sender information has been registered in the first or second electronic device 101 or 102. According to an embodiment, the second electronic device 102 may output a vibration or sound corresponding to the event as well as a screen relating to the event on the display 410 thereof.

The second electronic device 102, after the output for the event, may determine whether to approve (or reject) the event (e.g., the call connection request) received through the first electronic device 101 on the basis of a user input (e.g., an input through a call connection icon 405 displayed on the display 410 of the second electronic device 102). In some embodiments, the second electronic device 102 may transmit a control message for controlling the first electronic device 101 to accept or reject the event (e.g., the call connection request) to the first electronic device 101 in response to the user input.

According to various embodiments, a case in which the second electronic device 102 approves an event will be exemplified. The second electronic device 102 may transmit a control message for making a request to connect a call connection of the third electronic device 104 to the second electronic device 102 to the first electronic device 101 in response to a user input. The first electronic device 101 may approve the request for the call connection received from the third electronic device 104 and relay the call to the second electronic device 102 on the basis of the control message (approval of the request for the call connection) received from the second electronic device 102. According to an embodiment, the first electronic device 101 may also display information 403 on the event relayed to the second electronic device 102 on the display 150 thereof.

As described above, according to the various embodiments, the first electronic device 101 may relay an event received from the outside (e.g., the third electronic device 104 of the another user) to the second electronic device 102 on the basis of a function (e.g., an application, processes, etc.) that is being executed by the first electronic device 101 while operating in a specific mode. According to an embodiment, the first electronic device 101, when receiving a call connection request from the outside (e.g., the third electronic device 104), may acquire information associated with at least one function running in the first electronic device 101. For example, the first electronic device 101 may acquire information associated with a specific running function (e.g., a music reproduction function, a video reproduction function, and/or a game function). The specific function (e.g., a function running in the first electronic device 101, such as a music reproduction function, a video reproduction function, and/or a game function) may be configured in advance, and may be a function that is specified to relay an event received by the first electronic device 101 from the outside to at least one other electronic device (e.g., the second electronic device 102).

According to various embodiments, when receiving an event from the outside (e.g., the third electronic device 104) while performing a specific function (operation), the first electronic device 101 may refrain from notifying of the event therethrough, but may relay the event to another specified electronic device (e.g., the second electronic device 102). In other words, so as not to stop, suspend, or prevent the running function, the first electronic device 101 may refrain from outputting a notification of the event (e.g., may not display the information associated with the call connection request on the display 150 and/or output it with a ring tone, or may not output a notification message for the call connection request on the display 150). That is, the first electronic device 101 may relay the call connection request event in order to inform of the notification of the call connection request event from the third electronic device 104 through the second electronic device 102. When a user responds to the notified event (e.g., the notification of the call connection request) through the second electronic device 102, the user may make the call which the third electronic device 104 has requested from the first electronic device 101 (e.g., may make a call with the user of the third electronic device 104) through the second electronic device 102.

According to various embodiments, the function of relaying (or forwarding) an event received from the outside (e.g., an external event) as described above may be activated or deactivated by the second electronic device 102 connected to the first electronic device 101. According to various embodiments, when the first electronic device 101 is released from the connection with the second electronic device 102 (or the first electronic device 101 is beyond the control range of the second electronic device 102), the first electronic device 101 may perform a processing operation (e.g., various notifications) for an external event.

Figure 4B:
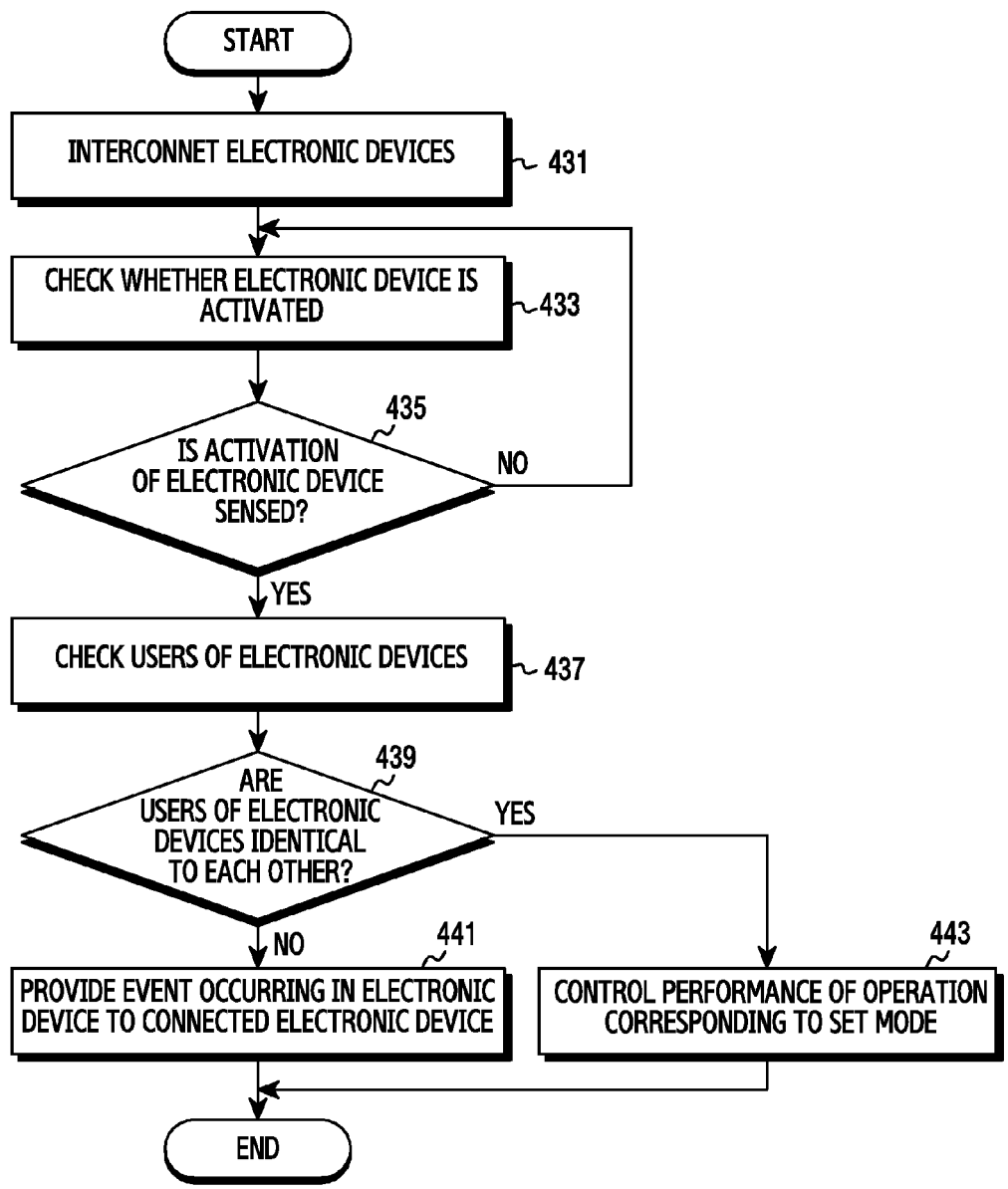
FIG. 4B is a flowchart of an example of a process, according to various embodiments of the present disclosure.

FIG. 4B is a flowchart of an example of a process, according to various embodiments of the present disclosure.

Referring to FIG. 4B, FIG. 4B may represent an example of an operation in which the electronic device operates in the same way as the first electronic device (e.g., a smart phone, a tablet PC, etc.), as described above, to provide an event received (sensed) from the outside to the second electronic device (e.g., a wearable device) connected thereto.

In operation 431, a connection may be established between two electronic devices (e.g., a wearable device and a smart phone). For example, the first and second electronic devices may be connected to (paired with) each other by way of Bluetooth communication.

In operations 433 and 435, the electronic device may check the state thereof to determine whether the electronic device has been activated. In various embodiments, the electronic device may determine a change in the activation thereof. In various embodiments, the activation of the electronic device may be determined by checking a specific event occurring in the electronic device, for example, by checking the time when the electronic device is changed from a suspended state to a resume state, and a lock setting is unlocked through an input of a pattern lock, a PIN code value, etc. In various embodiments, when receiving a specific event, for example, an application notification, a call, a message, etc. from the outside, the electronic device may determine that the electronic device has been changed to an activated state.

In various embodiments, prior to operations 433 and 435, the electronic device may further perform an operation of sensing (determining) a state where a counterpart electronic device connected thereto is worn. For example, in instances in which the second electronic device is paired with the first electronic device, the first electronic device may identify whether the second electronic device is worn by a user (e.g., a manager or parent). In various embodiments, whether the second electronic device is worn may be sensed by information exchange between the first and second electronic devices. According to various embodiments, the second electronic device may determine whether the second electronic device is worn based on various sensors (e.g., an acceleration sensor, a heart rate sensor, etc.) and may provide information corresponding to that to the first electronic device. According to an embodiment, in instances in which a user moves, the second electronic device may determine a state in which the second electronic device is worn, by using a change in an acceleration sensor value. According to an embodiment, in instances in which the user does not move, the second electronic device may determine that the second electronic device is worn if a heart rate is sensed through a heart rate sensor. In various embodiments, a sensor that can identify the state of a watch strap may be provided at the second electronic device or the watch strap thereof to sense the locked or unlocked state of the watch strap and determine whether the second electronic device is worn in correspondence to that.

When it is determined in operation 435 that the electronic device is not activated, the electronic device may return to operation 433 to perform the following operations.

When it is determined in operation 435 that the electronic device is activated, the electronic device may detect whether the two electronic devices are being use by the same user in operation 439.

For example, when sensing a change in the activation of the electronic device, the electronic device (e.g., the second electronic device) may determine whether the user of the counterpart electronic device and the user of the electronic device are identical to each other. In various embodiments, whether the users are identical to each other may be determined using the distance according to the positions where the electronic devices are used. According to an embodiment, the distance may be determined using an RSSI value of Bluetooth, the level of ultrasonic waves, or a change in the level. According to an embodiment, in instances in which the RSSI level of Bluetooth is a threshold value or higher, or where it rapidly varies from a lower value to a higher value, it may be determined that the users of the first and second electronic devices are identical to each other. According to various embodiments, the operation 437 may be performed by more accurately identifying the distance between the electronic devices through the substitution or combination of another communication (e.g., 3G, LTE, GPS, Wi-FI, Zigbee, ultrasonic waves, etc.) in addition to Bluetooth.

In various embodiments, if a user setting is already made for a specific mode, such as a "kids" mode or a guest mode, in the electronic device, or if entrance to a specific mode is configured by the counterpart electronic device, it may be determined that the user of the first electronic device and the user of the second electronic device differ from each other.

When it is determined in operation 439 that the electronic devices are being used by the same user, the electronic device may control the performance of an operation on the basis of a set mode (e.g., a "kids" mode or a guest mode) or a normal mode in operation 443.

When it is determined in operation 439 that the users of the electronic devices differ from each other, the electronic device may provide an event occurring therein to the connected counterpart electronic device in operation 441. For example, the electronic device may refrain from outputting a notification of an event (e.g., a call, a message, an application notification, etc.) received from the outside (for example, may not display it, or may not output it with a ring tone or vibration), and forward the received event to the connected counterpart electronic device. Or, the electronic device may refrain from notifying the connected counterpart electronic device of an event using the electronic device (or a change of state). According to an embodiment, when it is determined that the user of the electronic device and the user of the counterpart electronic device are different, the electronic device may provide (e.g., indirectly notify) various events occurring in the electronic device only to the user of the connected counterpart electronic device, or may notify the user of the counterpart electronic device that another user uses the electronic device. That is, according to the various embodiments, information which the electronic device will provide may be preferentially offered to the connected counterpart electronic device, or a function in the electronic device may be restricted.

Figure 5:
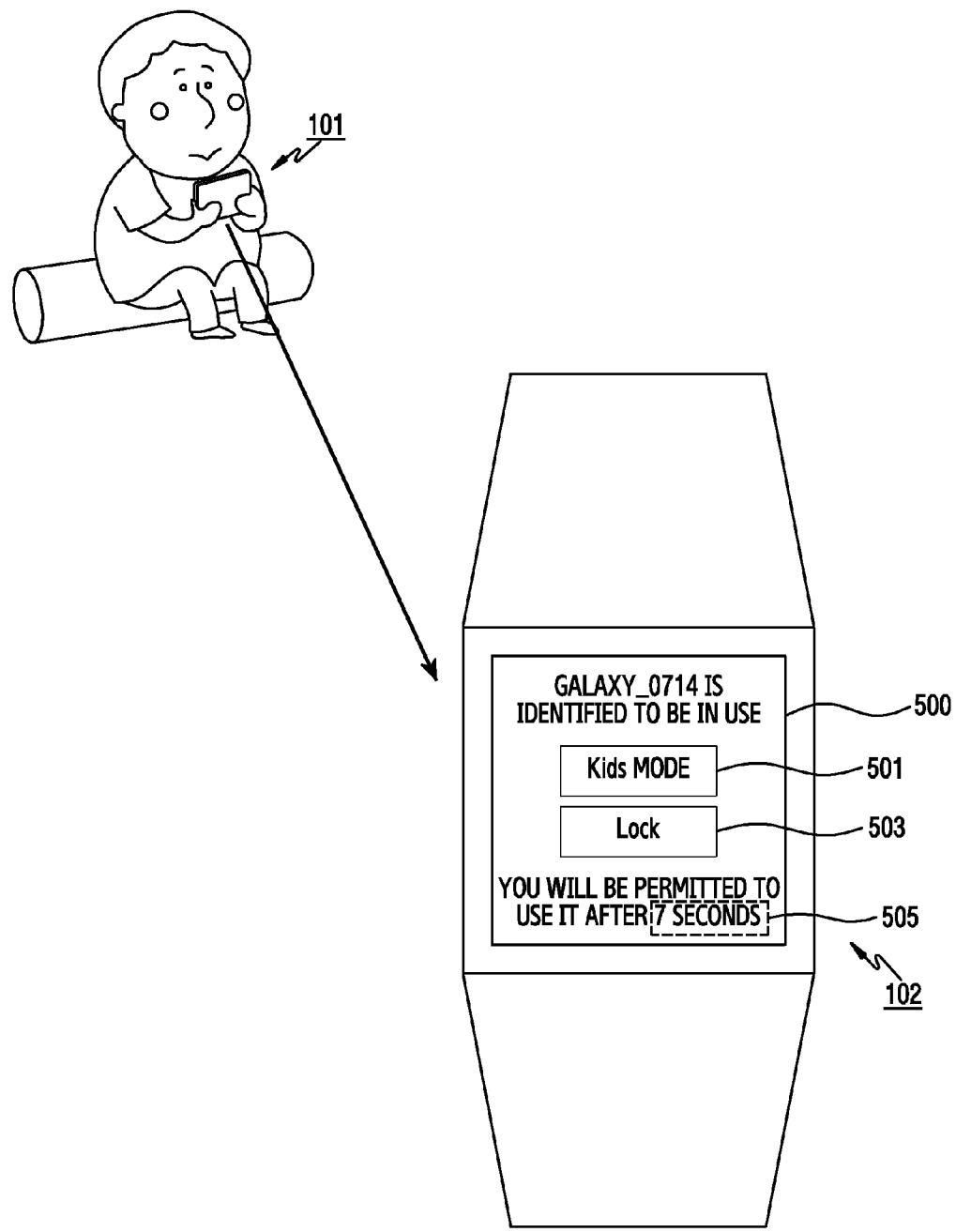
FIG. 5 is a diagram illustrating an example of the operation of a pair of electronic devices, according to various embodiments of the present disclosure.

FIG. 5 is a diagram illustrating an example of the operation of a pair of electronic devices, according to various embodiments of the present disclosure.

According to various embodiments, in instances in which the first electronic device 101 senses that the first electronic device 101 is used in a standby state, the first electronic device 101 may transmit information associated with the use of the first electronic device 101 to the second electronic device 102 connected thereto. In instances in which the first electronic device 101 receives a message corresponding to the transmitted information from the second electronic device 102, the first electronic device 101 may control itself (e.g., may change the mode thereof) according to the received message.

According to an embodiment, in the standby state, the first electronic device 101 may detect that the display 150 thereof is turned on (e.g., enters an activated state). When detecting the entrance to the activated state, the first electronic device 101 may transmit an indication to that effect to the second electronic device 102. According to an embodiment, when detecting that the first electronic device 101 is changed from the standby state to the activated state, the first electronic device 101 may acquire user information associated with a user that uses the first electronic device 101. For example, the first electronic device 101 may turn on the display 150 or a button (e.g., a touch screen or button including a fingerprint sensor) in response to the detection of the change of state and acquire user information (e.g., fingerprint information) from an input means (e.g., a finger) for entering an input on the display 150. Alternatively, the first electronic device 101 may turn on a camera thereof in response to the detection of the change of state and take a photo of a user of the first electronic device 101 through the camera to acquire user information (e.g., the user's face image). The first electronic device 101 may identify a specific user on the basis of the acquired user information (e.g., may determine whether the acquired user information is consistent with preset information through a comparison), and may determine whether a specific mode (e.g., a "kids" mode) that is associated with the identified user is supported. When it is determined that the specific mode for the corresponding user has been specified, the first electronic device 101 may transmit, to the second electronic device 102, a notification message requesting the second electronic device 102 to determine whether to change the first electronic device 101 to the specific mode.

The second electronic device 102 may provide a menu for controlling the first electronic device 101 (e.g., may display the menu on a display 500 thereof) on the basis of the information received from the first electronic device 101. For example, the second electronic device 102 may display a menu 501 to change the first electronic device 101 to the specific mode (e.g., a "kids" mode). The second electronic device 102 may display a menu 503 for transitioning the first electronic device 101 to a locked state (or a security state). While receiving the information from the first electronic device 101, the second electronic device 102 may count a set time (e.g., T seconds, where T is a natural number) during which a user (e.g., a user of the second electronic device 102) is able to identify the received information, and may display an operating screen 505 corresponding to that. For example, the second electronic device 102, after receiving the information from the activated first electronic device 101, may determine whether a specific input (e.g., a touch on the menu 501 or the menu 503) for a control corresponding to the received information is detected within the specified time (e.g., T seconds). After the specified time passes, the second electronic device 102 may display, for example, a menu for controlling to permit the performance of a program executed in the first electronic device 101. The second electronic device 102 may detect a user input on the basis of the menu provided, or in instances in which no user input is detected for the specified time, the second electronic device 102 may transmit the corresponding control message to the first electronic device 101.

In various embodiments, the second electronic device 102 may call the menu for controlling the first electronic device 101 on the basis of the notification message received from the first electronic device 101. However, the various embodiments of the present disclosure are not limited thereto, and the second electronic device 102 may also call the menu on the basis of, for example, a user input that is entered into the second electronic device 102. In addition, the first electronic device 101 may control the operation thereof on the basis of the control message received from the second electronic device 102, whether the first electronic device 101 transmits the notification message to the second electronic device 102.

The first electronic device 101 may control the operation thereof on the basis of the control message received from the second electronic device 102. For example, in instances in which the message received from the second electronic device 102 is for changing the first electronic device 101 to a specific mode (e.g., a "kids" mode), the first electronic device 101 may change to the "kids" mode. The first electronic device 101 may restrict a predetermined function from being used in response to the change to the "kids" mode.

According to various embodiments, in instances in which the first electronic device 101 detects that the restricted function is already executed at the time of the change to the "kids" mode, the first electronic device 101 may terminate the execution of the restricted function. The first electronic device 101, when terminating the use of the restricted function, may determine whether there is a change in the data of the restricted function. According to an embodiment, in instances in which the first electronic device 101 identifies the data change of the restricted function (e.g., deletion of data, a change in home screen settings, a change in application setting values, a change in arrangement of icons, etc.), the first electronic device 101 may check the time point prior to the change of the restricted function (e.g., the time of the execution of the restricted function). The first electronic device 101 may restore the data changed by the user of the first electronic device 101 to data prior to the change of the restricted function on the basis of the determination.

According to various embodiments, the first electronic device 101 may execute a specified program when changing to a "kids" mode according to the control message received from the second electronic device 102. According to various embodiments, the first electronic device 101 may perform an operation of backing up the first electronic device 101 when changing the mode thereof (e.g., changing to the "kids" mode) on the basis of the control message received from the second electronic device 102. According to various embodiments, the first electronic device 101 may back up information such as a user interface of the display 150, installed programs of the first electronic device 101, or data included in the memory 130 of the first electronic device 101.

According to various embodiments, the first electronic device 101 may recover (or restore) the first electronic device 101 to a previous state on the basis of the backup data when terminating the "kids" mode. The first electronic device 101 may determine whether to perform a backup on the basis of setting information or a backup environment such as a backup level (how much data is backed up) when the mode thereof is changed. The first electronic device 101 may apply backup environments distinguished depending on specific modes. The first electronic device 101 may perform a backup or determine whether to perform a backup on the basis of the backup environments configured according to the specific modes. Or, the first electronic device 101 may also perform a backup or determine whether to perform a backup on the basis of the control message received from the second electronic device 102.

Figure 6:
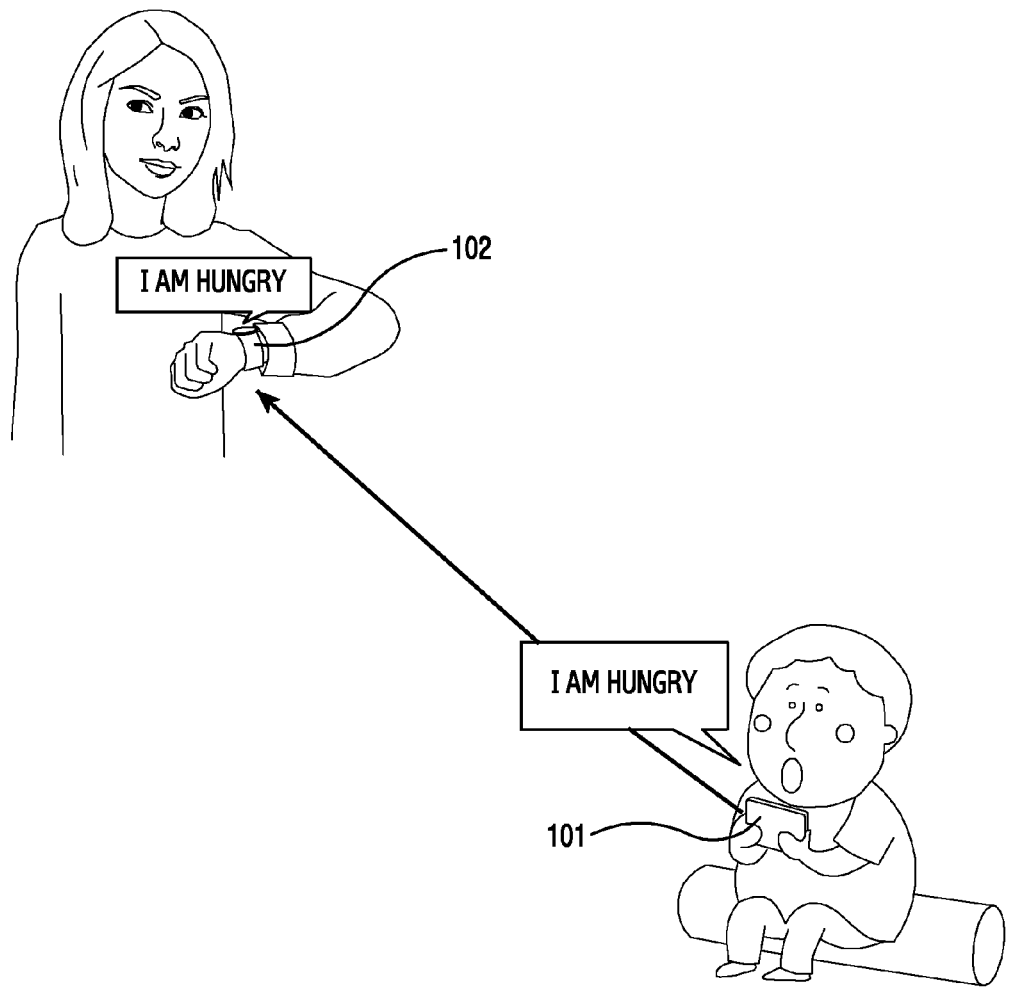
FIG. 6 is a diagram illustrating an example of the operation of a pair of electronic devices, according to various embodiments of the present disclosure.

FIG. 6 is a diagram illustrating an example of the operation of a pair of electronic devices, according to various embodiments of the present disclosure.

According to various embodiments, the first electronic device 101 may transmit/receive data to/from the second electronic device 102 when performing a specific mode (e.g., a "kids" mode). In the data transmission/reception with the second electronic device 102, the first electronic device 101 may transmit/receive at least one of voice data, audio data, and video data, which are entered by a user, in real time, or may transmit/receive data stored in the first or second electronic device 101 or 102.

According to an embodiment, the second electronic device 102 may transmit a control message for controlling activation (execution) of a video call function or a voice call function of the first electronic device 101 to the first electronic device 101 on the basis of a user input entered into the second electronic device 102. Based on the control message, the first electronic device 101 may activate the video call function or the voice call function with the second electronic device 102 and transmit an acknowledgement message for accepting a video call request or a voice call request to the second electronic device 102. In various embodiments, the first electronic device 101 may activate the corresponding function on the basis of the control message received from the second electronic device 102. Or, according to various embodiments, the first electronic device 101 may automatically activate the corresponding function on the basis of setting information thereof (e.g., detecting a corresponding condition according to a sensing operation for the execution of the corresponding function) and make a notification (or request) to the second electronic device 102. According to an embodiment, in instances in which it is detected that the first electronic device 101 is used by a specific user, the first electronic device 101 may request a video or voice call connection with the second electronic device 102.

According to various embodiments, the first and second electronic devices 101, 102 may establish a video or voice call connection in correspondence with a specific communication method configured (established) therebetween. For example, the first electronic device 101, when connecting a video or voice call with the second electronic device 102, may determine a present communication method (e.g., Bluetooth communication or Wi-Fi communication) by which the connection with the second electronic device 102 is established. In instances in which it is determined that the connection between the first and second electronic devices 101, 102 has not been established through a preset communication method (e.g., Bluetooth communication or Wi-Fi communication), the first electronic device 101 may connect a video or voice call through the preset communication method (e.g., Bluetooth communication, Wi-Fi communication, or cellular communication). In instances in which it is identified that the connection between the first and second electronic devices 101, 102 has been established through the preset communication method, the first electronic device 101 may perform an operation of connecting a video or voice call with the second electronic device 102 through the currently established communication method (e.g., Bluetooth communication or Wi-Fi communication).

According to various embodiments, in instances in which the first electronic device 101 fails to connect with the second electronic device 102 through a specified communication (e.g., Bluetooth communication or Wi-Fi communication), the first electronic device 101 may refrain from connecting a video or voice call in real time, but may transmit/receive stored video or voice data to/from the second electronic device 102 at a predetermined time and/or predetermined time intervals. For example, the first electronic device 101 may also use a function (or program), such as push to talk (PTT), when transmitting/receiving call data to/from the second electronic device 102. An example of a specific operation for the PTT function in the various embodiments will be described below with reference to FIG. 13.

According to various embodiments, the first electronic device 101 may output a voice and/or video corresponding to the control message on the basis of the control message received from the second electronic device 102. For example, in instances in which the first electronic device 101 receives a "termination" message entered through the second electronic device 102, the first electronic device 101 may output a specified message, such as "You have used it for much too long.", in response to the "termination" message. In addition, the first electronic device 101 may terminate a running program therein and change to a standby mode in response to the "termination" message.

According to various embodiments, the first electronic device 101 may receive a control message from the second electronic device 102 while having performed a specific function (e.g., a video reproduction function) for a specified time or more. Here, the control message may be a control message for outputting a specified interface on the display 150 of the first electronic device 101, or may be a control message for outputting specific audio through a speaker of the first electronic device 101. The first electronic device 101 may acquire information associated with a running function therein after performing an operation corresponding to the control message. In instances in which there is no change in the operating state of the running function (e.g., where the reproduction of a video is not terminated), the first electronic device 101 may repetitively perform the operation corresponding to the control message.

Figure 7:
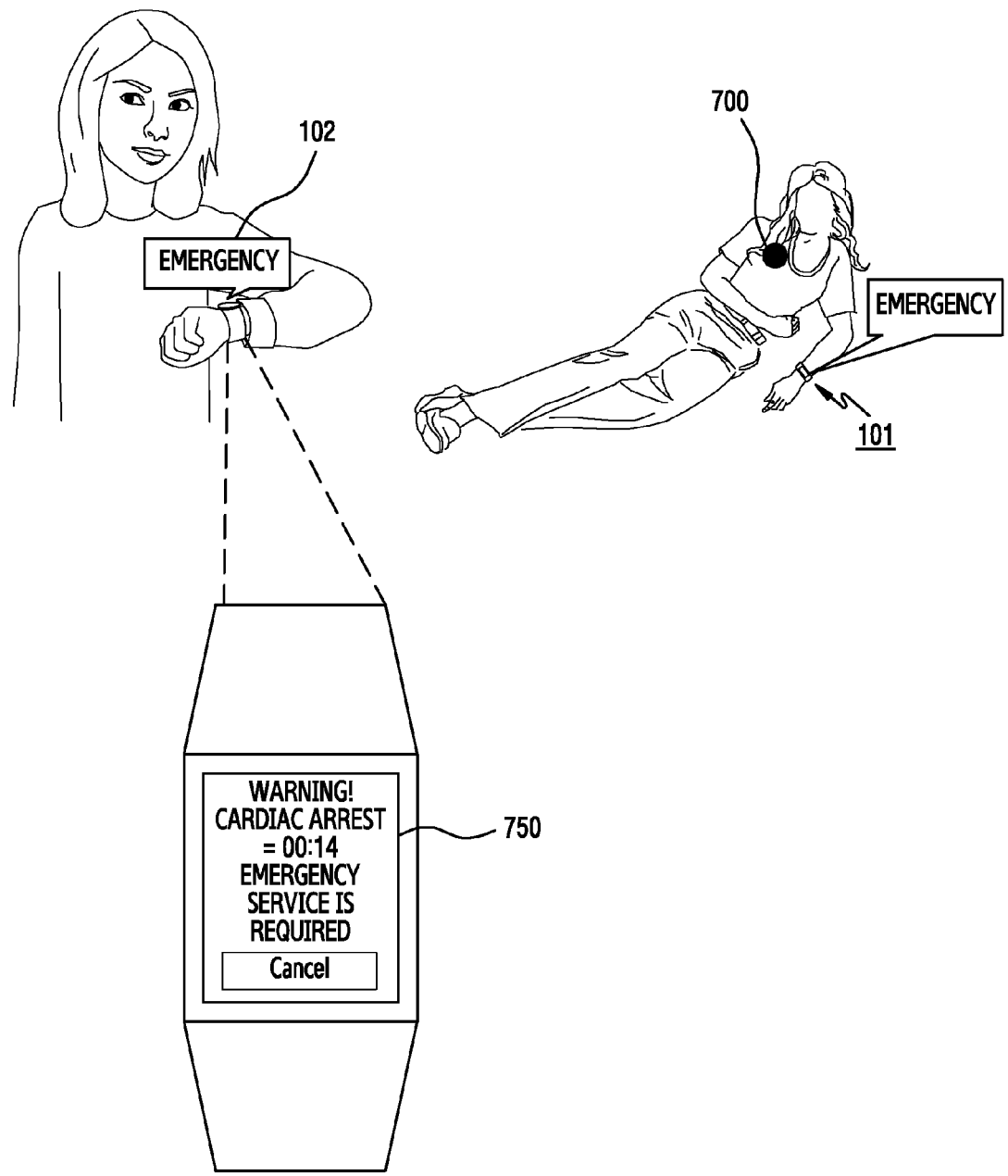
FIG. 7 is a diagram illustrating an example of the operation of a pair of electronic devices, according to various embodiments of the present disclosure.

FIG. 7 is a diagram illustrating an example of the operation of a pair of electronic devices, according to various embodiments of the present disclosure.

In FIG. 7, the first electronic device 101 may be a device (e.g., a wearable device such as a smart watch) that can be worn on a user's body part. The first electronic device 101 may acquire biometric information of a user wearing the first electronic device 101 while operating in a specific mode (e.g., a "kids" mode) by identifying the use of a specific user. According to an embodiment, the first electronic device 101 may acquire the user's biometric information through a built-in sensor (e.g., the sensor module 240 including at least one sensor). For example, first electronic device 101 may measure the heart rate of the user wearing the first electronic device 101 on the basis of a heart-rate measurement sensor and may sense a case (e.g., cardiac arrest) where the user's heart rate is beyond a specified range (e.g., a numerical value (e.g., a reference value) corresponding to a normal range of a preset heart-rate database). In instances in which the user's heart rate is beyond a normal range, the first electronic device 101 may transmit the user's biometric information (e.g., a cardiac arrest state, a body temperature, etc.) to the second electronic device 102.

In various embodiments, the first electronic device 101 may transmit the user's biometric information along with the position information of the first electronic device 101. According to an embodiment, the first electronic device 101 may identify the position thereof through a position identification sensor (e.g., the GPS module 227) included therein, and may create position information corresponding to the identified position to transmit the position information along with the biometric information.

In various embodiments, the first electronic device 101 may output a notification message for a situation that has occurred (e.g., an emergency situation). In addition, for the situation that has occurred, the first electronic device 101 may connect a voice or video call to a contact (e.g., 119, the second electronic device 102, etc.) specified in advance in an emergency service.

According to various embodiments, various sensors (e.g., a heart-rate measurement sensor 700) for acquiring the user's biometric information may not be included in the first electronic device 101, but may be worn on the user's body part (e.g., near the heart). In this case, the heart-rate measurement sensor 700 may transmit the user's measured biometric information (e.g., heart-rate information) to the first electronic device 101 through wireless communication (e.g., Bluetooth, Wi-Fi, NFC, etc.). The first electronic device 101 may determine whether the user is in an emergency situation on the basis of the biometric information received from the heart-rate measurement sensor 700. Based on the determination result, the first electronic device 101 may notify the second electronic device 102 of the user's emergency through at least some of the various methods described above.

According to various embodiments, in response to the notification from the first electronic device 101, the second electronic device 102 may transmit control information, which is configured for the control of the first electronic device 101, according to a user input or automatically. According to an embodiment, the second electronic device 102 may transmit, to the first electronic device 101, control information for executing an electric shock function by the first electronic device 101, or control information for controlling a defibrillation function of the heart-rate measurement sensor 700 connected to the first electronic device 101. The first electronic device 101 may control the execution of an operation corresponding to the control information received from the second electronic device 102. For example, the first electronic device 101 may expose the user to an electric shock (or electric signal) on the basis of the received control information. Alternatively, the first electronic device 101 may request the heart-rate measurement sensor 700 to perform a defibrillation function in instances in which the heart-rate measurement sensor 700 is capable of performing the defibrillation function.

According to various embodiments, the second electronic device 102 may notify a user of the second electronic device 102 of various notifications corresponding to a notification message received from the first electronic device 101. According to an embodiment, the second electronic device 102 may output (display) various pieces of notification information associated with the emergency situation of the first electronic device 101 as exemplified by reference numeral 750 on the basis of the received notification message.

According to various embodiments, the first electronic device 101 may identify information associated with the distance between the first and second electronic devices 101, 102 while operating in a specific mode (e.g., a missing-child prevention mode) by identifying the use of a specific user. For example, the first electronic device 101 may identify information associated with the distance from the second electronic device 102 when detecting the movement thereof. In instances in which it is detected that the first electronic device 101 is separated by a specified distance or more from the second electronic device 102, the first electronic device 101 may identify the movement thereof and transmit it to the second electronic device 102.

According to various embodiments, in the identification of the movement of the first electronic device 101, the first electronic device 101 may transmit, to the second electronic device 102, various pieces of information as movement information thereof, such as the moving direction and speed of the first electronic device 101, a moving direction relative to the second electronic device 102, the distance from the second electronic device 102, and the position information of the first electronic device 101 through the GPS module 227. The first electronic device 101 may output a notification message through the display thereof on the basis of the movement information of the first electronic device 101. According to an embodiment, the first electronic device 101 may output a specified message, such as "This child is looking for parents," as the notification message and may also output a message input (transferred) through the second electronic device 102. The second electronic device 102 may output feedback corresponding to the notification message of the first electronic device 101. According to an embodiment, the second electronic device 102 may display a specified message (e.g., distance information, direction information, position information, etc.), such as "The child is moving in the A direction," in response to the movement information of the first electronic device 101 and may also additionally process a vibration or sound output in parallel.

Figure 8:
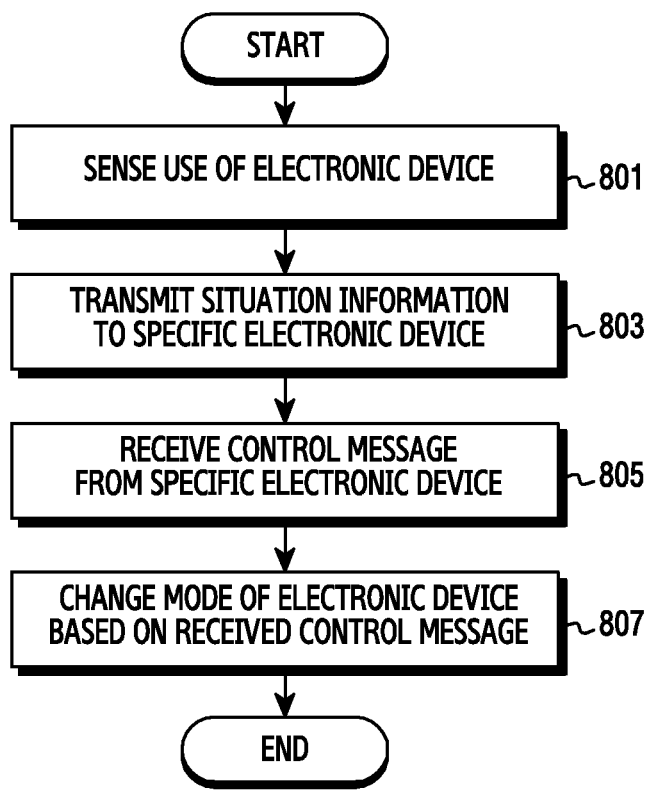
FIG. 8 is a flowchart of an example of a process, according to various embodiments of the present disclosure.

FIG. 8 is a flowchart of an example of a process, according to various embodiments of the present disclosure.

Referring to FIG. 8, in operation 801, the first electronic device 101 may sense a state in which the first electronic device 101 is being used on the basis of an operation performed thereby. According to an embodiment, the specified use of the first electronic device 101 may correspond to a case where the first electronic device 101 changes from a standby state (e.g., the off state of the display 150) to an activated state (e.g., the on state of the display 150). According to an embodiment, the first electronic device 101 may detect a situation (activated state) where the first electronic device 101 is being used by a user on the basis of information acquired through at least one sensor included therein. For example, the first electronic device 101 may detect a situation in which the first electronic device 101 is being used on the basis of information detected through a sensor, such as the gyro sensor 240B or the acceleration sensor 240E, for sensing a motion of the first electronic device 101 in the on state of the display 150. According to an embodiment, the first electronic device 101 may detect a situation where the first electronic device 101 is being used on the basis of information acquired through the grip sensor 240F and/or the biometric sensor 240I with which a user's body part makes contact, without being limited to determining the situation where the first electronic device 101 is being used on the basis of the motion information of the first electronic device 101 acquired through the gyro sensor 240B and/or the acceleration sensor 240E. According to an embodiment, in instances in which the first electronic device 101 includes a camera (e.g., the camera module 291), if a user's face is detected through the camera, the first electronic device 101 may detect a situation in which the first electronic device 101 is being used. Through at least one of the aforementioned methods, the first electronic device 101 may detect a situation in which the first electronic device 101 is being used or starts to be used by a specified user.

In operation 803, the first electronic device 101 may transmit a notification message (e.g., situation information) for the use of the first electronic device 101 to a specific electronic device (e.g., the second electronic device 102). According to an embodiment, the first electronic device 101 may be configured to transmit the notification message to the second electronic device 102 connected thereto through Bluetooth or Wi-Fi communication when the use of the first electronic device 101 is sensed. The first electronic device 101 may transmit, to the second electronic device 102, at least one of information associated with an executed (or running) program, information associated with time during which the program has been used, information associated with a user who uses the program (e.g., a user profile in instances in which the user is specified to the first electronic device 101), and information for making a request for determining whether to execute a specific mode (e.g., a "kids" mode) corresponding to the specified user.

In operation 805, the first electronic device 101 may receive a control message from the second electronic device 102 to which the first electronic device 101 has transmitted the notification message for the operating situation thereof. The first electronic device 101 may control the operation thereof on the basis of the received control message. According to an embodiment, the control message received from the second electronic device 102 may include a control message that is generated based on a user input detected through the second electronic device 102 on the basis of the notification message transmitted by the first electronic device 101.

In operation 807, the first electronic device 101 may control the operation thereof on the basis of the control message received from the second electronic device 102. According to an embodiment, the first electronic device 101 may change to a specific mode on the basis of the received control message. For example, the first electronic device 101 may transmit, to the second electronic device 102, information as to whether to enter into "kids" mode in correspondence with the user detected through operation 801, and may receive the control message for executing the "kids" mode from the second electronic device 102 through operation 805. The first electronic device 101 may change to the "kids" mode in response to the control message. The first electronic device 101, when changing to the "kids" mode, may identify a restricted program on the basis of the changed mode, and in instances in which the restricted program is being executed, the first electronic device 101 may terminate the corresponding program. When changing the mode, the first electronic device 101 may also back up the situation information thereof immediately before the mode change on the basis of setting information.

The electronic device 101 may terminate the embodiment of FIG. 8 after performing operation 807.

Figure 9:
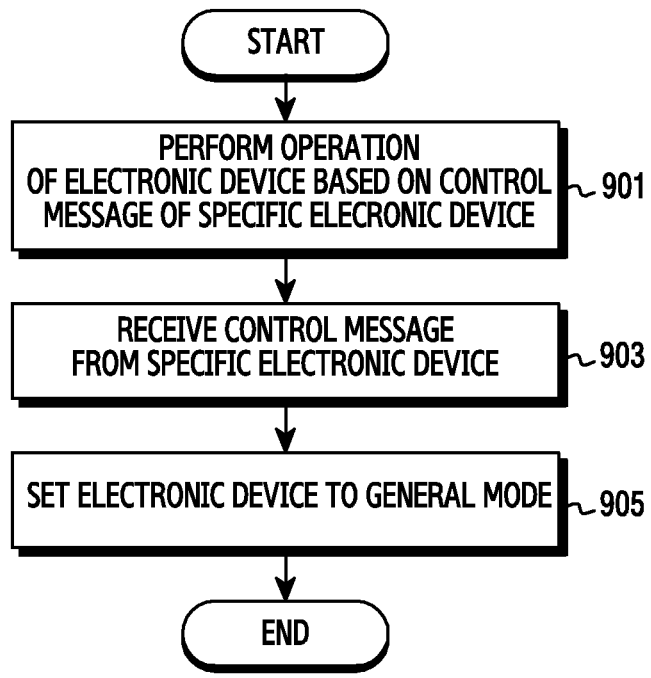
FIG. 9 is a flowchart of an example of a process, according to various embodiments of the present disclosure.

FIG. 9 is a flowchart of an example of a process, according to various embodiments of the present disclosure.

Referring to FIG. 9, in operation 901, the first electronic device 101 may change the operating state (e.g., mode) thereof on the basis of a control message (or a control command) received from a specific electronic device (e.g., the second electronic device 102) to perform the corresponding operation (mode). The operation 901 performed by the first electronic device 101 may be the same as or similar to the operation 807 of FIG. 8.

In operation 903, the first electronic device 101 may receive a control message from the second electronic device 102 in the mode (e.g., a "kids" mode) executed based on operation 901. According to an embodiment, the first electronic device 101 may receive a control message for terminating the running mode from the second electronic device 102. The control message for terminating the running mode may include a message for changing (e.g., terminating) the running mode, which is received from the second electronic device 102 after the first electronic device 101 changes the operating state thereof (e.g., changes to the "kids" mode) on the basis of the control message (e.g., the control message for the mode change) previously received from the second electronic device 102.

In operation 905, the first electronic device 101 may control the operation thereof on the basis of the received control message. According to an embodiment, the first electronic device 101 may terminate the specific mode (e.g., a "kids" mode), which is being executed in the first electronic device 101, on the basis of the received control message. The first electronic device 101, when terminating the running mode, may change to a general mode (e.g., a basic mode, a standby mode, or another specific configured (requested) mode) which is configured for the first electronic device 101. In instances in which it is identified that backup data at the time of the execution of the "kids" mode exists, the first electronic device 101 may recover itself on the basis of the corresponding backup data.

The electronic device 101 may terminate the embodiment of FIG. 9 after performing operation 905.

Figure 10:
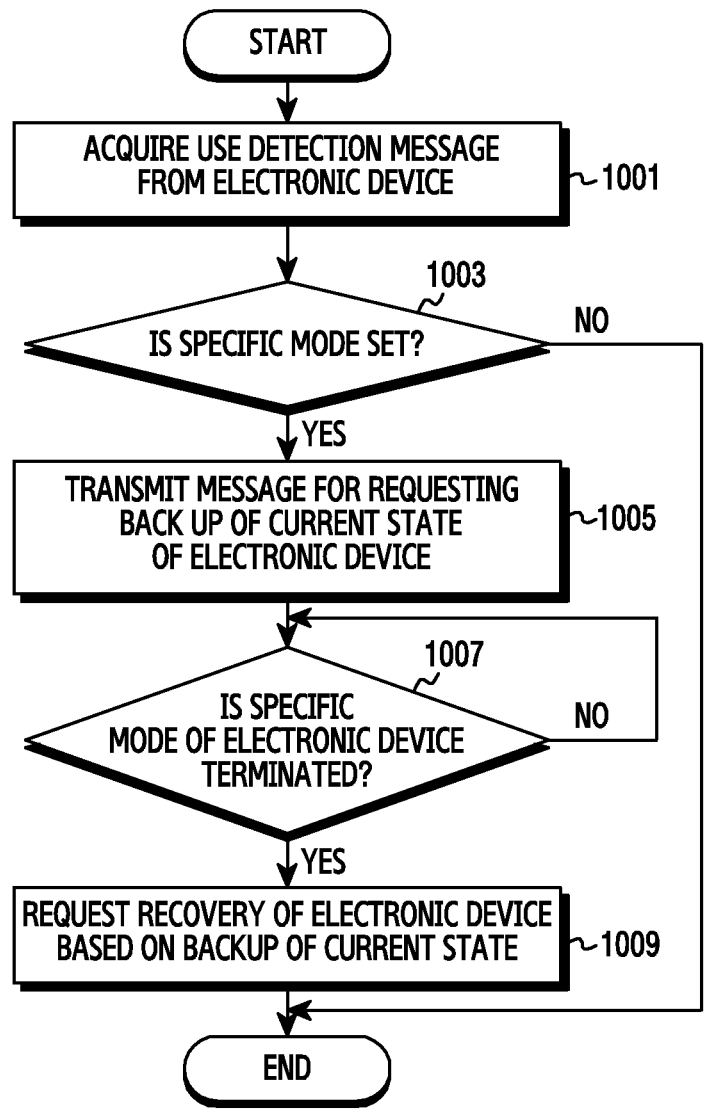
FIG. 10 is a flowchart of an example of a process, according to various embodiments of the present disclosure.

FIG. 10 is a flowchart of an example of a process, according to various embodiments of the present disclosure.

Referring to FIG. 10, in operation 1001, the first electronic device 101 may detect the use of the first electronic device 101 on the basis of an operation performed thereby and transmit a notification message corresponding to the detection to a specific electronic device (e.g., the second electronic device 102). The second electronic device 102 may sense the state in which the first electronic device 101 is being used on the basis of the received notification message. According to various embodiments, the operation of determining the state where the first electronic device 101 is being used may be the same as or similar to the operation 801 of FIG. 8.

In operation 1003, the second electronic device 102 may determine whether to configure a specific mode for the first electronic device 101 on the basis of the received notification message. For example, the second electronic device 102 may determine whether to transmit a control message for changing the first electronic device 101 to the specific mode.

According to an embodiment, the second electronic device 102 may provide a menu for determining a controllable operation of the first electronic device 101 (e.g., display the menu on the display 150 of the second electronic device 102) on the basis of the received notification message. The second electronic device 102 may determine whether to change the first electronic device 101 to the specific mode (e.g., a "kids" mode) on the basis of the menu provided. In the determination of the mode change, the second electronic device 102 may also terminate a running program in the first electronic device 101 and determine to change the first electronic device 101 to a standby state, without being limited to controlling the first electronic device 101 to operate in the specific mode.

In operation 1005, when requesting the first electronic device 101 to operate in the specific mode, the second electronic device 102 may transmit a control message for making a request for backing up the current state (e.g., situation information) of the first electronic device 101 together. According to an embodiment, the second electronic device 102, when transmitting the control message, may transmit a control message for requesting the first electronic device 101 to back up the situation information together on the basis of a user input detected by the second electronic device 102. In instances in which the first electronic device 101 receives the control message for requesting itself to operate in the specific mode, the first electronic device 101 may change to the specific mode and may also perform a backup operation thereof on the basis of the control message (or setting information) while changing to the specific mode.

In operation 1007, the second electronic device 102 may determine whether a user input is detected for terminating the specific mode (e.g., a "kids" mode) running in the first electronic device 101. According to an embodiment, the second electronic device 102 may detect a user input for controlling the first electronic device 101 to terminate the running "kids" mode and operate in the basic mode configured for the first electronic device 101. Alternatively, the second electronic device 102 may detect a user input for controlling the first electronic device 101 to terminate the running "kids" mode and change to the standby mode. According to various embodiments, the second electronic device 102 may provide information associated with various modes that the first electronic device 101 may provide, without being limited to controlling the first electronic device 101 to terminate the specific mode (e.g., a "kids" mode) running in the first electronic device 101 and operate in the configured basic mode. In addition, the second electronic device 102 may also provide information in order to select and control a specific program of the first electronic device 101, without being limited to providing information associated with a specified mode which the first electronic device 101 may execute.

In operation 1009, the second electronic device 102 may transmit a control message for making a request for terminating the specific mode running in the first electronic device 101 to the first electronic device 101. According to various embodiments, when transmitting the control message, the second electronic device 102 may transmit a control message for requesting the recovery of the first electronic device 101 together on the basis of the data which was backed up at the time of the execution of the specific mode. When performing the operation of recovering the first electronic device 101 on the basis of the backup data, the first electronic device 101 may perform the operation on the basis of the control message received from the second electronic device 102.

Alternatively, the first electronic device 101 may also automatically perform the recovery operation at the time of the termination of the specific mode in the first electronic device 101. According to an embodiment, the first electronic device 101 may compare situation information thereof with the situation information at the time of the backup of the first electronic device 101 when terminating the specific mode running therein on the basis of the control message received from the second electronic device 102. When the comparison result shows that a specified amount or more of data has been changed, or the specified situation information of the first electronic device 101 (e.g., a user interface, the setting information of the first electronic device 101, etc.) has been changed, the first electronic device 101 performs the recovery operation thereof.

The second electronic device 102 may terminate the embodiment of FIG. 10 after performing operation 1009.

Figure 11:
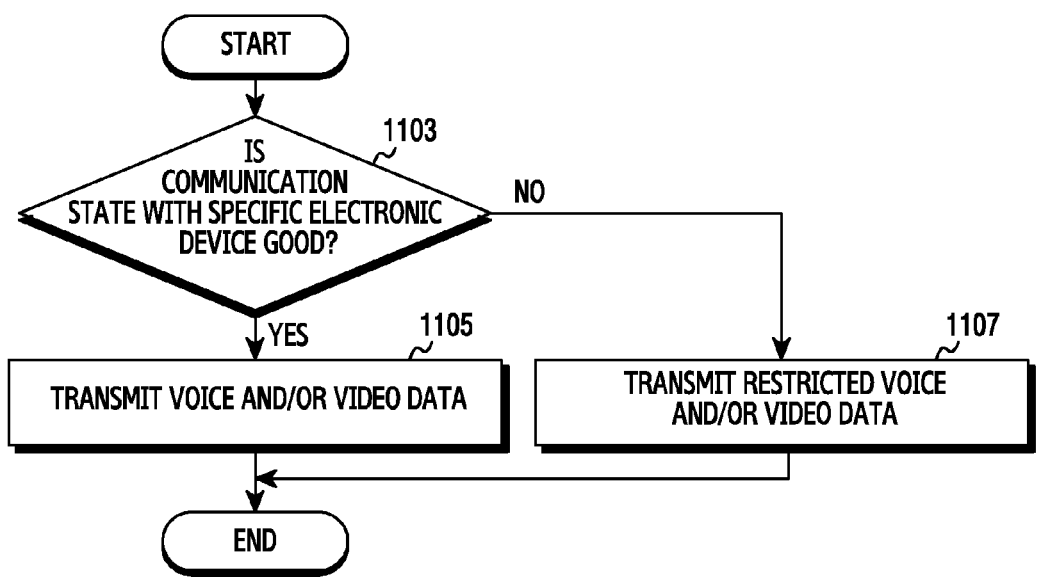
FIG. 11 is a flowchart of an example of a process, according to various embodiments of the present disclosure.

FIG. 11 is a flowchart of an example of a process, according to various embodiments of the present disclosure.

According to various embodiments, the operation of FIG. 11 may be performed in the situation where the first electronic device 101 has received a control message from the second electronic device 102, and a specific mode has been executed in response to the control message. For example, operation 1103 may be performed in the situation where an operation the same as or similar to operation 807 of FIG. 8 or operation 901 of FIG. 9 has been performed.

Referring to FIG. 11, in operation 1103, the first electronic device 101 may identify the communication quality of the second electronic device 102 connected thereto through network communication. According to an embodiment, the first electronic device 101 may identify the quality of the network communication with the second electronic device 102 in order to identify an environment for transmitting/receiving data (e.g., video data for a video call and/or voice data for a voice call) to/from the second electronic device 102. The first electronic device 101 may identify the communication quality of a communication method that is specified for data transmission/reception with the second electronic device 102. When it is determined that the communication quality is higher than a specified value (e.g., the RSSI reference value), the first electronic device 101 may perform operation 1105 of transmitting/receiving real-time data (e.g., performing a real-time video call or a real-time voice call). In contrast, when it is determined that the communication quality is lower than the specified value, the first electronic device 101 may perform operation 1107 of transmitting/receiving restricted data.

Referring to operation 1105, the first electronic device 101 may transmit/receive (e.g., bilaterally communicate) the real-time video call data and/or the real-time voice call data through a communication method satisfying the specified value or more among network communication methods through which the first electronic device 101 is connected to the second electronic device 102. In instances in which it is determined that the quality of the communication method used for data transmission/reception varies to a lower value than the specified value, the first electronic device 101 may transmit/receive the real-time video call data and/or the real-time voice call data to/from the second electronic device 102 through a communication method having a higher quality than the specified value among the other communication methods through which the first electronic device 101 is connected to the second electronic device 102. The first electronic device 101 may perform operation 1107 in instances in which a communication method satisfying the specified value cannot be determined from the various communication methods for the connection with the second electronic device 102 in the aforementioned operation.

Referring to operation 1107, the first electronic device 101 may transmit/receive restricted video call data and/or restricted voice call data through the network communication method through which the first electronic device 101 is connected to the second electronic device 102. According to an embodiment, the first electronic device 101 may transmit/receive the data through a restricted method of receiving data after the completion of data transmission or transmitting data after the completion of data reception, instead of a real-time method of simultaneously transmitting and receiving data.

The electronic device 101 may terminate the embodiment of FIG. 11 after performing operation 1105 or 1107.

Figure 12:
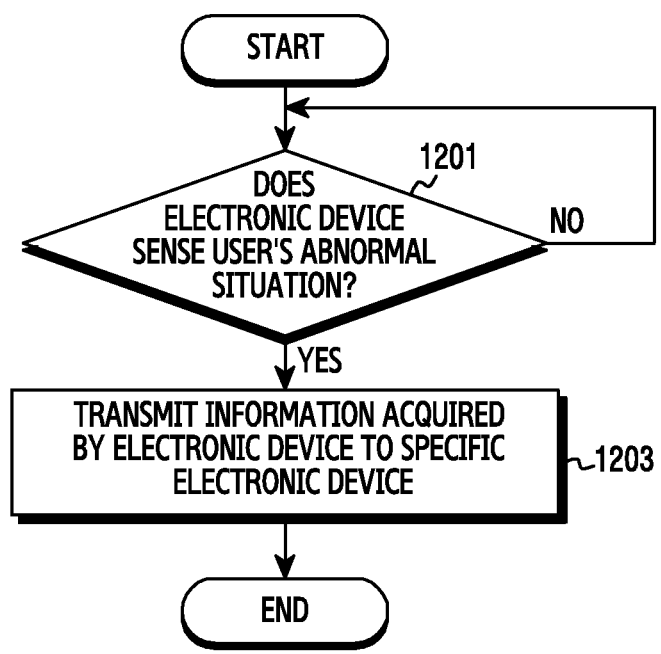
FIG. 12 is a flowchart of an example of a process, according to various embodiments of the present disclosure.

FIG. 12 is a flowchart of an example of a process, according to various embodiments of the present disclosure.

Referring to FIG. 12, in operation 1201, the first electronic device 101 may determine an abnormal situation of a user of the first electronic device 101 through at least one sensor (e.g., the sensor module 240) or a position measurement device (e.g., the GPS module 227). According to an embodiment, the first electronic device 101 may determine that the user of the first electronic device 101 is placed in an abnormal situation in instances in which the position measurement device (e.g., the GPS module 227) detects that the first electronic device 101 moves a specified distance or more in a direction away from the second electronic device 102. Alternatively, the first electronic device 101 may determine the user's abnormal situation (e.g., an emergency situation such as cardiac arrest or difficulty in breathing) through a device capable of acquiring the user's biometric information while being worn on the user's body part, such as a biometric sensor (e.g., the biometric sensor 240I of FIG. 2) of the first electronic device 101 or a heart-rate measurement sensor (e.g., the heart-rate measurement sensor 700 of FIG. 7) connected (e.g., connected through wireless communication) to the first electronic device 101. The first electronic device 101 may perform operation 1203 when determining that the user is placed in an abnormal situation, and may consistently or periodically monitor the user's situation if not so.

Referring to operation 1203, the first electronic device 101 may notify the second electronic device 102 of the user's monitored abnormal situation. For example, the first electronic device 101 may acquire various pieces of information capable of representing the state of the user, such as the position information (e.g., coordinates) of the first electronic device 101, the user's biometric information, the motion information of the first electronic device 101, and the like, and may transmit the acquired information to the second electronic device 102.

According to an embodiment, in instances in which the first electronic device 101 is a specified distance (e.g., a preset reference distance) or more away from the second electronic device 102, the first electronic device 101 may create the motion information thereof on the basis of various pieces of information such as the travel direction and speed of the first electronic device 101, the travel direction relative to the second electronic device 102, the distance from the second electronic device 102, and the position information of the first electronic device 101. The first electronic device 101 may transmit the created motion information to the second electronic device 102.

According to an embodiment, in instances in which the user's situation information (e.g., a heart rate) is beyond a preset normal range, the first electronic device 101 may transmit the user's biometric information (e.g., a cardiac arrest state, a body temperature, etc.) to the second electronic device 102. The first electronic device 101 may transmit the user's biometric information along with the position information of the first electronic device 101. The first electronic device 101 may output a notification message for the situation that has occurred (e.g., emergency situation) and may also make a voice call and/or a video call to a contact (e.g., 119 or the second electronic device 102) specified for an emergency service. The first electronic device 101 may also transmit the user's biometric information and position information to the emergency service provider.

The electronic device 101 may terminate the embodiment of FIG. 12 after performing operation 1203.

As described above, according to the various embodiments of the present disclosure, the first electronic device (e.g., a smart phone) and the second electronic device (e.g., a wearable device) may interwork with each other within a predetermined range in which communication therebetween is possible, and one of them can control the other through the interworking therebetween. According to various embodiments, the first or second electronic device, when being used (e.g., held or worn) by a manager (e.g., a parent), may operate as a parent terminal (or a mother terminal) that can control or manage the other electronic device. According to various embodiments, the first or second electronic device, when being used (e.g., held or worn) by another user (e.g., a child) other than the manager, may operate as a child terminal that is controlled or managed by the other electronic device. For example, in various embodiments of the present disclosure, electronic devices interworking with each other may operate in a parent-child structure.

According to various embodiments of the present disclosure, in instances in which a manager (e.g., a parent) wears the second electronic device (e.g., a wearable device) and a user (e.g., a child) operates the first electronic device (e.g., a smart phone), the first electronic device may offer (notify) various pieces of information associated with the use of the first electronic device to the second electronic device.

According to an embodiment, when the child attempts to use (or operate) the first electronic device in a state where the first and second electronic devices are connected to each other, the first electronic device may sense the change of state thereof (e.g., the use of the first electronic device) and provide information associated with that (e.g., situation information) to the second electronic device. For example, the first electronic device may sense the motion thereof through an acceleration sensor, a gravity sensor, or the like. The first electronic device may sense the child's face (e.g., a pre-registered face image of the child) through a front camera thereof. The first electronic device may sense a touch input on a touch screen, the touch area of which is smaller than that of the manager's (parent's) finger. The first electronic device may sense a change in signal strength information (e.g., RSSI) of the connected communication (e.g., Bluetooth communication). For example, the first electronic device may sense a change in signal strength information in instances in which the first electronic device moves further away from the second electronic device or is maintained in the current state, and may sense the movement thereof or a state in which the first electronic device is held in a user's hand. The first electronic device may create information (e.g., a notification message) corresponding to a sensed event and provide the information according to the event to the second electronic device.

According to an embodiment, in the state where the first and second electronic devices are connected to each other, the first electronic device may monitor a state in which the user (e.g., a child) uses the first electronic device and provide the monitoring result to the second electronic device. For example, the first electronic device may monitor information associated with content (e.g., music, videos, photos) being reproduced through the first electronic device, information associated with applications being used in the first electronic device, information associated with the operating time of the applications, information associated with a total time spent by the user using the first electronic device, captured screen images being used in the first electronic device, information associated with a battery residual quantity of the first electronic device, and the like, and may provide the monitored information to the second electronic device.

According to an embodiment, in the state where the first and second electronic devices are connected to each other, the first electronic device may provide an indirect notification function when the user (e.g., a child) uses the first electronic device. For example, in instances in which the first electronic device is in a "kids" mode, the user of the first electronic device may want to continue to view a video or use an application without any disturbance to his/her current action. In this case, in various embodiments, the first electronic device may refrain from providing a notification (e.g., display, sound, or vibration) output for an external event, such as a call, a message, an application notification, or the like, which may occur through the first electronic device. The first electronic device may refrain from outputting the external event, and may transfer (forward) the external event to the second electronic device connected thereto such that the second electronic device outputs a notification corresponding to the external event. In various embodiments, the aforementioned operation for the external event may be on/off controlled by the second electronic device. Furthermore, in instances in which the first electronic device is beyond a controllable range of the second electronic device, the first electronic device may output the notification for the external event.

According to various embodiments of the present disclosure, in instances in which the manager wears the second electronic device (e.g., a wearable device) and the user (e.g., a child) operates the first electronic device (e.g., a smart phone), the second electronic device may provide a remote control function over the first electronic device.

According to an embodiment, in the state where the first and second electronic devices are connected to each other, the manager (e.g., a parent) may control the initiation and termination of various functions (e.g., a "kids" mode, a missing-child prevention mode, etc.) of the first electronic device using the second electronic device. For example, when the manager identifies, through the second electronic device, a notification that the other user (e.g., a child) uses the manager's first electronic device, the manager may change his/her first electronic device from a general mode to a "kids" mode through a remote control using the second electronic device. In various embodiments, in instances in which a specific mode (e.g., a "kids" mode) of the first electronic device is configured by the second electronic device, the set specific mode may be released only by the second electronic device, or the first electronic device may release the set specific mode for the first electronic device using manager authentication such as fingerprint recognition, a password, or the like.

According to an embodiment, in the state where the first and second electronic devices are connected to each other, the manager (e.g., a parent) may control input/output functions of the first electronic device using the second electronic device. For example, by using the second electronic device, the manager may remotely restrict an error or a setup change that may be caused by the other user (e.g., a child) operating the first electronic device. That is, the manager may restrict an input function of the first electronic device, for example, an input through a touch screen, a button, or the like. Furthermore, by using the second electronic device, the manager may control an output function in order to restrict the use of the first electronic device which is being used by the other user (e.g., a child). For example, in response to the manager's input, the second electronic device may terminate various types of content, such as applications, music, videos, and digital broadcasts, which are being executed in the first electronic device, and may restrict display or sound outputs corresponding to the various types of content. That is, the second electronic device may set the first electronic device not to be operated.

According to an embodiment, in the state where the first and second electronic devices are connected to each other, the manager (e.g., a parent) may control a recovery function of the first electronic device using the second electronic device. For example, in a state where a specific mode (e.g., a "kids" mode) for restricting functions is not configured for the first electronic device, setting values, such as home screen (e.g., a wallpaper) setting (e.g., icon arrangement, folder information, etc.) or application setting (e.g., application setting information), may be modified by the other user (e.g., a child) who is operating the first electronic device. In various embodiments, the first electronic device may detect whether the setting values are modified and transmit information associated with the modification (e.g., the operating state of the first electronic device) to the second electronic device to notify it to the manager. The manager may identify the change in the setting values of the first electronic device (e.g., the operating state of the first electronic device) through the second electronic device. The second electronic device may transmit a control command to back up the modified items of the first electronic device in response to the manager's input, and the first electronic device may back the first electronic device up to the setting values prior to the modification in response to the control command of the second electronic device. For example, the first electronic device may recover the settings thereof to the existing "kids" mode setting state or the state before the settings are modified. In various embodiments, the first electronic device may sense the use of the first electronic device, periodically back up (store) and manage the current state information for recovery of the first electronic device, and recover the first electronic device on the basis of the backup state information.

According to various embodiments of the present disclosure, in instances in which the manager wears the second electronic device (e.g., a wearable device) and the user (e.g., a child) operates the first electronic device (e.g., a smart phone), a push to talk (PTT) (e.g., a voice or video call) function may be provided.

According to an embodiment, voice or video information exchange using Bluetooth (BT) connection may be provided between the first and second electronic devices. For example, in instances in which the BT connection may be made between the first and second electronic devices and data (e.g., voice and video data) is actively transmitted and received, the first and second electronic devices may exchange the voice and video information using the PTT function. According to an embodiment, it may be assumed that the manager (e.g., a parent) uses the second electronic device (e.g., a wearable device) and the user (e.g., a child) operates the first electronic device (e.g., a smart phone). In this case, the manager may transfer the voice and video information to the child using the PTT function, or the child may transfer the voice and video information to the manager using the PTT function.

According to an embodiment, in instances in which the PTT function using the BT connection between the first and second electronic devices is impossible, but the second electronic device may directly perform voice/data communication, voice or video information exchange may be made between the first and second electronic devices. For example, in instances in which the second electronic device supports voice/data communication and where data is actively transmitted and received although the BT connection between the first and second electronic devices is impossible, the first and second electronic devices may exchange voice and video information using the PTT function. According to an embodiment, it may be assumed that the manager (e.g., a parent) uses the second electronic device (e.g., a wearable device) and the user (e.g., a child) operates the first electronic device (e.g., a smart phone). In this case, even though there is no BT connection, the second electronic device may make voice/data communication using a SIM-card embedded therein. The manager may transfer the voice or video information to the child, who uses the first electronic device, through the PTT function using the second electronic device, and vice versa.

According to an embodiment, although a BT connection may be made between the first and second electronic devices, voice and video information may not be actively exchanged, or alternate voice/video data may be transferred using signals in response to a user selection instead of the voice and video information exchange. For example, in instances in which voice and video data is not actively transferred between the first electronic device (e.g., a smart phone) and the second electronic device (e.g., a wearable device), if the second electronic device transmits a signal (e.g., text information), the first electronic device may output (reproduce) voice or video data relevant to the corresponding signal (e.g., text information) (for example, may display it on a screen or may output it with a sound). In various embodiments, the first and second electronic devices may commonly store data corresponding to the signal, and the first or second electronic device may reproduce the data by executing a function in response to the signal. For example, the reproduction may be made using text to speech (TTS) or recorded data. Furthermore, according to an embodiment, even when data is actively transmitted and received, if the second electronic device transmits a signal according to a user selection, the first electronic device may reproduce voice or video data relevant to the corresponding signal, which is pre-stored in the first electronic device.

For example, when the manager (e.g., a parent) uses the second electronic device (e.g., a smart phone) and the user (e.g., a child) uses the first electronic device (e.g., a wearable device), the second electronic device may transmit a specific signal to the first electronic device in response to the manager's input, and the first electronic device may output voice or video information pre-stored therein to the user in response to the received signal, and vice versa. According to an embodiment, while the user (e.g., a child) uses the first electronic device of the manager (e.g., a parent), the manager may transmit signal 1 corresponding to an alert message regarding the use of the first electronic device through the second electronic device to the first electronic device. The first electronic device, when receiving signal 1, may output an alert message (e.g., "Please stop viewing videos.") with the manager's pre-stored voice corresponding to the received signal 1. According to another embodiment, when the second electronic device transmits signal 2 to the first electronic device, the first electronic device may output an alert message (e.g., "Do not take a closer look at it. Please, look at it from a distance.") with the manager's pre-stored voice or image corresponding to the received signal 2.

The operation of managing the PTT function according to the various embodiments of the present disclosure as described above will be described below with reference to FIG. 13.

Figure 13:
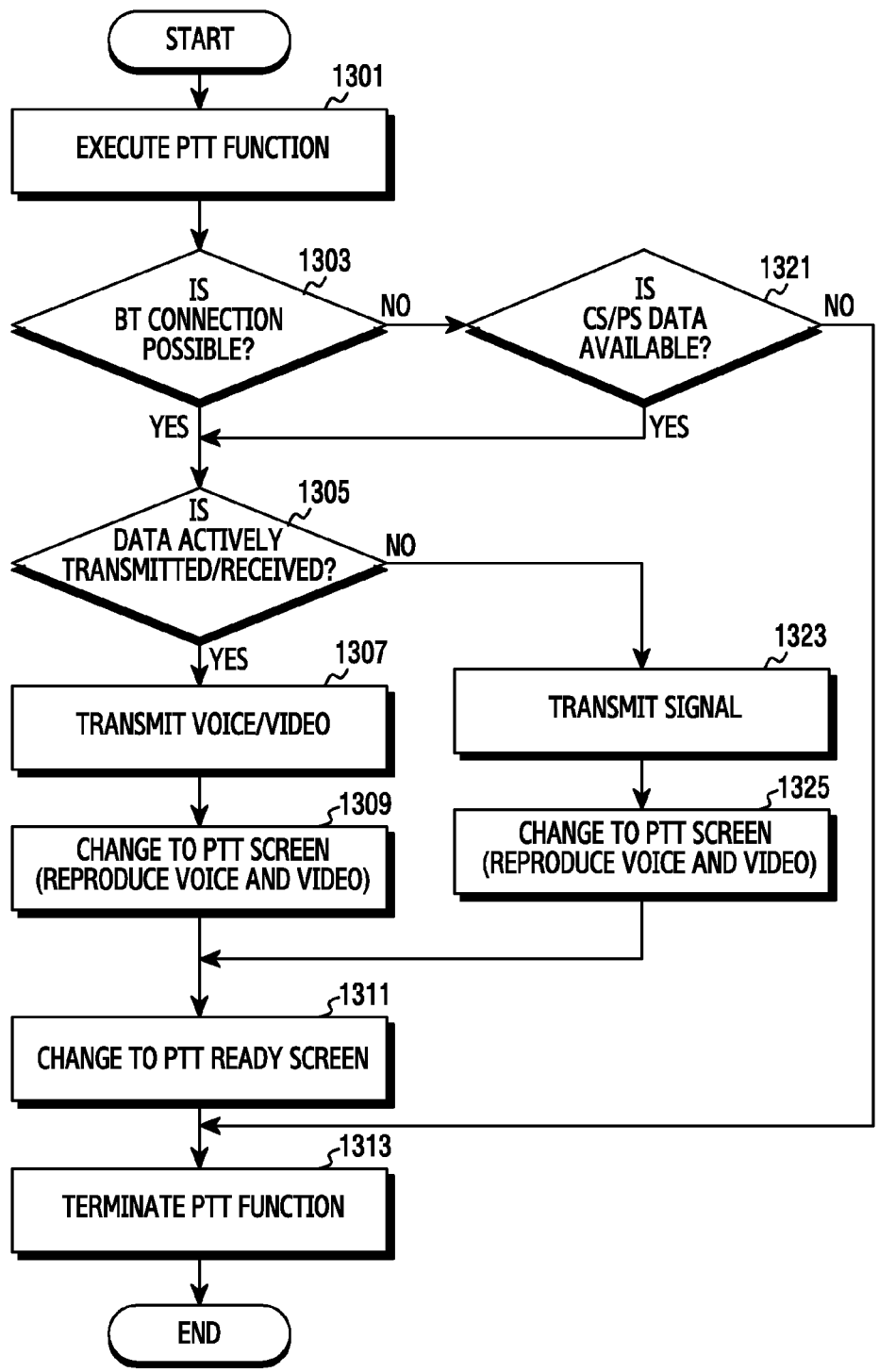
FIG. 13 is a flowchart of an example of a process, according to various embodiments of the present disclosure.

FIG. 13 is a flowchart of an example of a process, according to various embodiments of the present disclosure.

Referring to FIG. 13, in operation 1301, the electronic device (e.g., the first or second electronic device) may execute a PTT function in response to an input of a user (e.g., manager or child).

In operation 1303, the electronic device may determine whether a BT connection may be established in response to the execution of the PTT function.

When it is determined in operation 1303 that the BT connection may be established, the electronic device may, in operation 1305, determine whether data is actively transmitted and received. For example, the electronic device may determine the signal strength of the BT connection through which the electronic device is connected to a counterpart electronic device, and may determine whether the determined signal strength is a preset reference value or more.

When it is determined in operation 1305 that data is actively transmitted and received, the electronic device may transmit, to the counterpart electronic device, at least one piece of data corresponding to a user input among voice and video data in operation 1307.

In operation 1309, the electronic device may output data through a relevant user interface by performing a PTT screen change subsequent to or in parallel with the data transmission. For example, the electronic device may display the user interface corresponding to the PTT function through the display 150, and may reproduce data received from the counterpart electronic device to display an image of a counterpart electronic device user. Furthermore, the electronic device may reproduce the data received from the counterpart electronic device to output it with a voice of the counterpart electronic device user. That is, the electronic device may output at least one of the voice and video data according to the execution of the PTT function.

In operation 1311, the electronic device may change to a PTT ready screen when completely reproducing the transmitted or received data. When changing to the PTT ready screen, the electronic device may proceed to operation 1305 to periodically check the data transmission/reception state, or may proceed to operation 1313 to terminate the PTT function in response to a user input or under the control of the counterpart electronic device.

When it is determined in operation 1305 that data is inactively transmitted and received, or in response to a user selection, the electronic device may transmit a signal to the counterpart electronic device in operation 1323. For example, the electronic device may receive an input of a selected signal to be transmitted to the counterpart electronic device or a text input and transmit the selected signal or the text input (or a signal corresponding to the text) to the counterpart electronic device.

In operation 1325, the electronic device may output data through a relevant user interface by performing a PTT screen change subsequent to or in parallel with the selective transmission of the signal. For example, the electronic device may display the user interface corresponding to the PTT function through the display 150, and may reproduce and output at least one of pre-stored voice and video data corresponding to the signal received from the counterpart electronic device. According to an embodiment, the electronic device may display a pre-stored image of the counterpart electronic device user corresponding to the received signal, or may output a pre-stored voice of the counterpart electronic device user corresponding to the signal.

When it is determined in operation 1303 that the BT connection may not be established, the electronic device may, in operation 1321, determine whether voice or video data is available. For example, although the BT connection is impossible, the electronic device may determine whether to directly support voice or video data communication.

When it is determined in operation 1321 that the data is available, the electronic device may proceed to operation 1305 to perform the following operations. When it is determined in operation 1321 that the data is not available, the electronic device may proceed to operation 1313 to control the termination of the PTT function.

According to various embodiments of the present disclosure, in instances in which a manager (e.g., a parent) uses the first electronic device (e.g., a smart phone) and a user (e.g., a child) wears the second electronic device (e.g., a wearable device), various types of information associated with the user of the second electronic device may be provided (notified) to the first electronic device.

According to an embodiment, in a state where the first and second electronic devices are connected to each other, the child wearing the second electronic device may move away from the manager holding the first electronic device. The second electronic device may sense a change of state in which the distance from the first electronic device is beyond a predetermined range. For example, the second electronic device may check signal strength such as RSSI between the first and second electronic devices. The second electronic device may transmit information associated with the state thereof to the first electronic device when sensing that the distance from the first electronic device is beyond the predetermined range, or when sensing that the signal strength is reduced to a predetermined strength or less. According to an embodiment, the first and second electronic devices may exchange information associated with the distance therebetween, and when the distance is a preset distance or more, the second electronic device may notify it to the first electronic device. The second electronic device may provide various types of information including the travel direction, the travel distance, the position information thereof, the state information of the user of the second electronic device, and the like. Additionally or alternatively, the second electronic device may transmit various types of information to the first electronic device, and may also output various types of information through various output devices thereof (e.g., a display, a speaker, a motor, etc.). According to an embodiment, the second electronic device may provide the user with a preset output (e.g., a voice (e.g., "Stop"), a vibration, an alert message, etc.) for requesting the user to stop. Such an operation will be described below with reference to FIG. 14.

Figure 14:
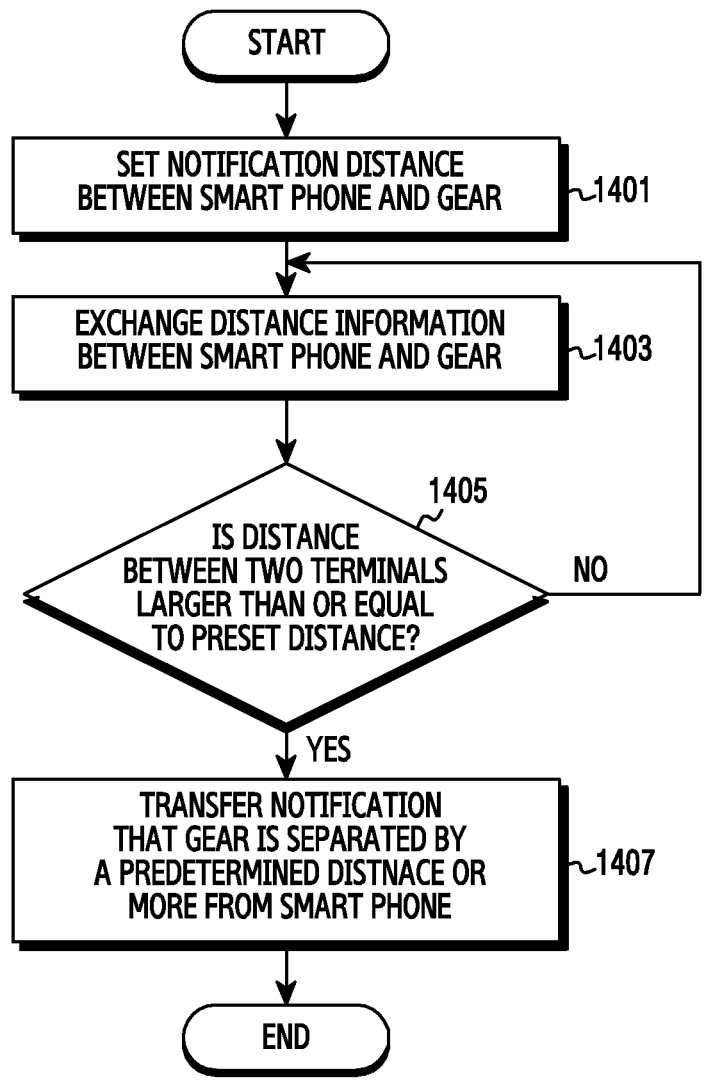
FIG. 14 is a flowchart of an example of a process, according to various embodiments of the present disclosure.

FIG. 14 is a flowchart of an example of a process, according to various embodiments of the present disclosure.

Referring to FIG. 14, in operation 1401, the electronic device may configure a notification distance from an electronic device connected thereto. For example, a manager may configure a notification distance (e.g., a reference distance value) for preventing a child from being missed, using the electronic device (e.g., the first or second electronic device). According to an embodiment, the manager may configure the notification distance using one electronic device, and the notification distance configured in the electronic device may be shared with a counterpart electronic device. According to another embodiment, the manager may also configure the same notification distance using each of the electronic devices.

In operation 1403, the electronic device may exchange information associated with the distance between the electronic devices with the counterpart electronic device connected thereto. For example, the electronic device may periodically exchange or measure the distance information according to a preset period, or may exchange or measure the distance information when sensing the movement thereof (or a change in the movement thereof).

In operation 1405, the electronic device may determine whether the distance between the electronic devices is a preset distance (e.g., notification distance) or more. For example, the electronic device may compare the distance information between the electronic devices acquired according to the information exchange and the preset distance information (e.g., notification distance), and may perform operation 1405 by calculating the distance difference therebetween.

When it is determined in operation 1405 that the distance between the electronic devices is smaller than the preset distance, the electronic device may proceed to operation 1403 to perform the following operations.

When it is determined in operation 1405 that the distance between the electronic devices is larger than or equal to the preset distance, in operation 1407 the electronic device may notify the counterpart electronic device connected thereto of the change of state thereof. For example, the electronic device may create or acquire various types of information for notifying that the electronic device moves a predetermined distance or more away from the counterpart electronic device and transmit it to the counterpart electronic device.

According to various embodiments of the present disclosure, state information associated with the user of the second electronic device (e.g., a wearable device) may be provided to the first electronic device (e.g., a smart phone), whereby the manager may provide management or monitoring for the user.

According to an embodiment, the second electronic device, while being worn by the user (e.g., a child), may collect state information (e.g., information associated with the user's body state such as a heart rate, the number of counted steps, etc.) on the user's state (or state change) using various sensors (e.g., a heart-rate sensor, an acceleration sensor, etc.) of the second electronic device. The second electronic device may transmit the collected state information to the first electronic device connected thereto periodically or in response to a request. The first electronic device may receive the state information from the second electronic device and notify the manager of the received state information associated with the basis of various configured output devices. Additionally or alternatively, the second electronic device may identify an abnormal situation (e.g., an emergency situation) of the user on the basis of the received state information. The second electronic device, when determining the user's abnormal situation, may provide various types of information (e.g., a video, a manual, etc.) relating to a method to cope with the determined abnormal state. Furthermore, the second electronic device, when determining the user's abnormal situation, may also transmit various types of information (e.g., the user's position information and abnormal state information) to inform of the user's abnormal state to some preset contact information (e.g., an emergency contact, a fire station, a police station, etc.).

According to an embodiment, in the state where the first and second electronic devices are connected to each other, the second electronic device may monitor a situation in which the user (e.g., a child) wearing the second electronic device wakes up or cries alone and may provide the monitoring result to the first electronic device. For example, it may be assumed that the manager (e.g., a parent) fails to listen to the sound of the user (e.g., a child) while doing household chores, or the manager and the user are slightly separated from each other in a noisy place. The second electronic device worn by the user may sense user information, such as heart-rate information and motion information, through various sensors (e.g., a heart-rate sensor or an acceleration sensor). The second electronic device may determine whether the user has woken up on the basis of the sensed user information and provide a corresponding notification to the first electronic device when it is determined that the user has woken up.

In another example, it may be assumed that the user cries alone in a different room. The second electronic device may sense a sound (e.g., a cry) of a preset reference or more (e.g., a predetermined time interval or more, or a predetermined decibel or more) while being worn by the user or being around the user (being mounted on a cradle and charged). For example, the second electronic device may analyze a total time during which a sound (e.g., a cry) is sensed and the magnitude of the input sound through a microphone, and may determine whether the user is crying on the basis of the analysis result. When it is determined that the user is crying, the second electronic device may transmit a corresponding notification to the first electronic device. Alternatively, the second electronic device may provide information (e.g., an input time, a decibel, etc.) corresponding to a sound input through a microphone to the first electronic device, and may determine the user's state on the basis of information received from the first electronic device to provide a corresponding notification to the first electronic device. Operations of the electronic device corresponding to that will be described below with reference to FIG. 15.

Figure 15:
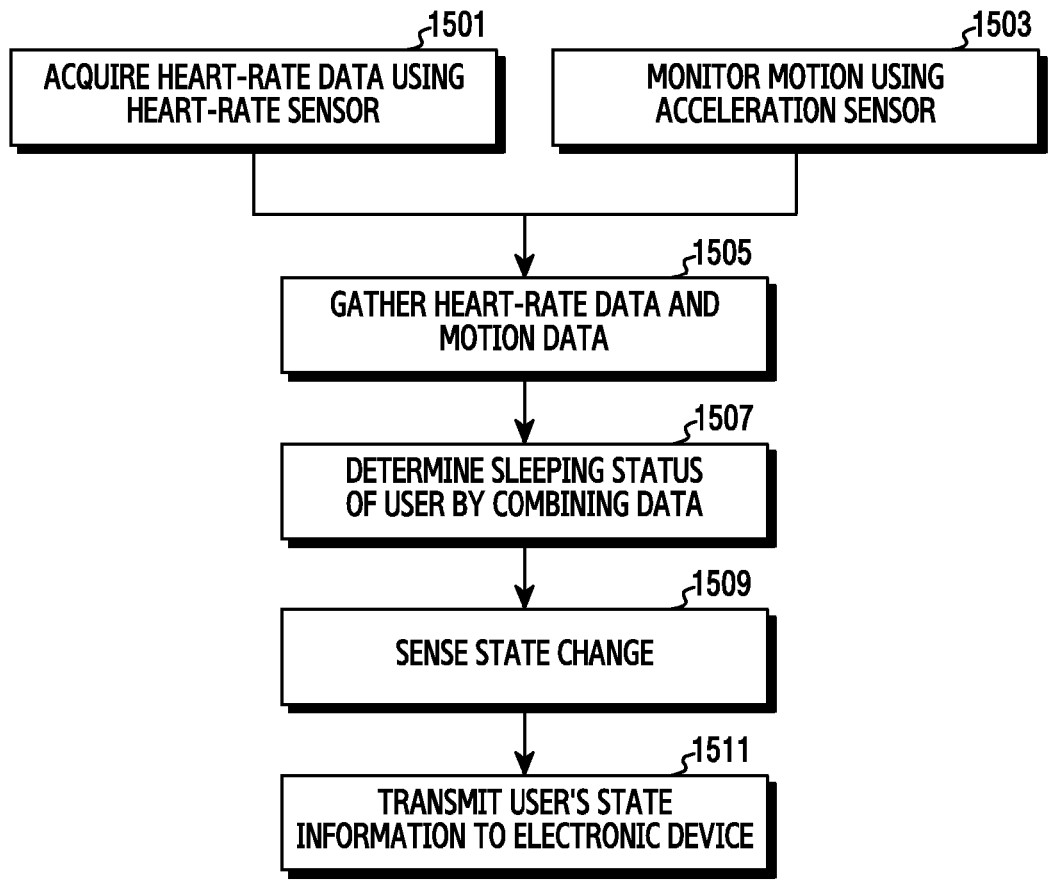
FIG. 15 is a flowchart of an example of a process, according to various embodiments of the present disclosure.

FIG. 15 is a flowchart of an example of a process, according to various embodiments of the present disclosure.

Referring to FIG. 15, it may be assumed in FIG. 15 that a user is sleeping while wearing the first electronic device such as a wearable device.

The electronic device may acquire the user's heart-rate data using a heart-rate sensor in operation 1501 and monitor the user's motion using an acceleration sensor in operation 1503. In various embodiments, operations 1501 and 1503 may be performed in parallel, or may be individually performed according to a preset period or in response to a sensed specific event.

In operation 1505, the electronic device may gather the heart-rate data in operation 1501 and the motion data in operation 1503.

In operation 1507, the electronic device may determine the sleeping state of the user on the basis of the heart-rate data and the motion data.

In operation 1509, the electronic device may detect the changed state of the user (e.g., an awake state) on the basis of the determination result in the operation 1507, and in operation 1511, the electronic device may transmit state information according to the changed state of the user to a counterpart electronic device connected thereto.

In FIG. 15, it has been exemplified that the electronic device transmits the state information according to the user's change of state to the counterpart electronic device. According to various embodiments, the electronic device may also provide state information (e.g., a sleeping state or an awake state) according to the current state of the user to the counterpart electronic device connected thereto on the basis of the determination result in the operation 1507.

A specific embodiment corresponding to FIG. 15 will hereinafter be described with reference to FIG. 16.

Figure 16:
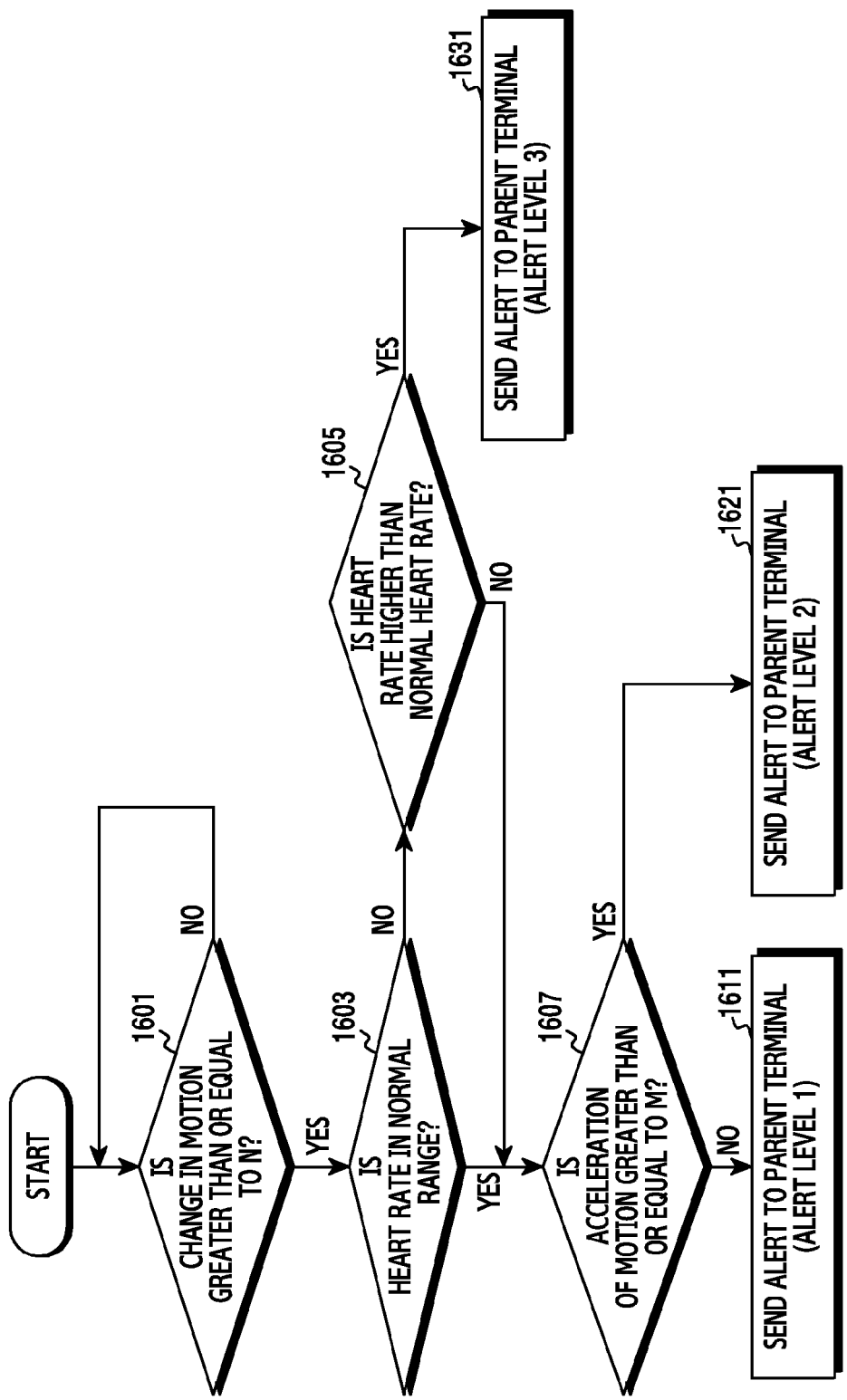
FIG. 16 is a flowchart of an example of a process, according to various embodiments of the present disclosure.

FIG. 16 is a flowchart of an example of a process, according to various embodiments of the present disclosure.

Referring to FIG. 16, an example of transmitting an alert level corresponding to a user's state is illustrated in FIG. 16.

In operation 1601, the electronic device may determine a change in the user's motion. For example, the electronic device may determine whether the motion change is a preset reference value (e.g., N, where N is a natural number) or more. In various embodiments, the user's motion change may be sensed on the basis of various sensors (e.g., an acceleration sensor, a gyro sensor, a geomagnetic sensor, a motion sensor, etc.) included in the electronic device.

When it is determined in operation 1601 that the motion change is less than N, the electronic device may continue to check the motion change. When it is determined in operation 1601 that the motion change is greater than or equal to N, the electronic device may determine whether a heart-rate is in a preset normal range in operation 1603. In various embodiments, the user's heart rate may be measured on the basis of a heart-rate sensor, etc. included in the electronic device.

When it is determined in operation 1603 that the user's heart rate is in the normal range, the electronic device may determine the acceleration of the motion in operation 1607. For example, the electronic device may determine whether the acceleration of the motion is a preset reference value (e.g., M, where M is a natural number) or more. In various embodiments, the acceleration of the user's motion may be sensed on the basis of various sensors (e.g., an acceleration sensor, a gyro sensor, a motion sensor, etc.) included in the electronic device.

When it is determined in operation 1607 that the acceleration of the motion is less than M, the electronic device may transmit information regarding an alert level corresponding to the determination result among preset alert levels to a counterpart electronic device (e.g., a parent terminal) connected thereto in operation 1611. For example, the electronic device may determine an alert level (e.g., alert level 1 among the various preset alert levels) corresponding to the user state based on the determination results in the operations 1601, 1603, 1607 and transmit information corresponding to the determined alert level to the parent terminal.

According to an embodiment, in instances in which the electronic device senses a rapid (sudden) motion thereof, the electronic device may determine that the user wearing (or holding) the electronic device moves. In various embodiments, when the electronic device is detected to start to move from an almost stationary state, it may be set as a situation where the preset user or another user moves while wearing or carrying the electronic device. Alternatively, it may be set as a situation where the preset user (e.g., a child) wakes up and moves. The electronic device, when sensing such a situation, may notify the parent terminal of the corresponding situation using alert level 1 (e.g., a lower alert level) configured to correspond to the situation. In various embodiments, the counterpart electronic device may forward the corresponding situation to a user of the counterpart electronic device through an output corresponding to alert level 1.

When it is determined in operation 1607 that the acceleration of the motion is greater than or equal to M, the electronic device may transmit information of an alert level corresponding to the determination result among the preset alert levels to the counterpart electronic device (e.g., the parent terminal) connected thereto in operation 1621. For example, the electronic device may determine an alert level (e.g., alert level 2 among the various preset alert levels) corresponding to the user state based on the determination results in the operations 1601, 1603, 1607 and transmit information corresponding to the determined alert level to the parent terminal.

According to an embodiment, when the electronic device senses a change from a general motion to a sudden motion, the electronic device may determine it to be a situation change that the user wearing (or carrying) the electronic device starts to suddenly move (e.g., run). In various embodiments, in instances in which the acceleration of the motion of the electronic device rapidly varies, a situation of making an alert regarding prevention of missing-child or theft may be set. The electronic device, when sensing such a situation change, may notify the parent terminal of the corresponding situation using alert level 2 (e.g., an intermediate alert level) configured to correspond to the situation. In various embodiments, the counterpart electronic device may forward the corresponding situation to the user of the counterpart electronic device through an output corresponding to alert level 2.

When it is determined in operation 1603 that the user's heart rate is not included in the normal range, the electronic device may determine whether the heart rate is higher or lower than a normal heart rate in operation 1605. For example, in instances in which the user's measured heart rate is beyond the preset normal range, the electronic device may determine whether the user's heart rate is higher or lower than the normal heart rate.

When it is determined in operation 1605 that the user's heart rate is lower than the normal heart rate, the electronic device may proceed to operation 1607 to perform the following operations. For example, the electronic device may determine an alert level (e.g., alert level 1 or 2) corresponding to the user's state based on the determination results in the operations 1601, 1603, 1605, 1607 and perform an operation (e.g., operation 1611 or 1621) of transmitting information corresponding to the determined alert level to the parent terminal.

When it is determined in operation 1605 that the user's heart rate is higher than the normal heart rate, the electronic device may transmit information regarding an alert level corresponding to the determination result among the preset alert levels to the counterpart electronic device (e.g., the parent terminal) connected thereto in operation 1631. For example, the electronic device may determine an alert level (e.g., alert level 3 among the various preset alert levels) corresponding to the user state based on the determination results in the operations 1601, 1603, 1605 and transmit information corresponding to the determined alert level to the parent terminal.

According to an embodiment, the electronic device may sense a sudden motion thereof, and when it is determined that the user's heart rate is high, the electronic device may determine it to be an emergency situation. In various embodiments, when the electronic device is detected to start to rapidly move from an almost stationary state (e.g., by a gyro sensor), if the user's heart rate measured through a heart-rate sensor is higher than a typical value, it may be determined that the user is placed in an emergency situation. For example, it may be determined to be a situation where the user wearing or carrying the electronic device is greatly surprised or psychologically shrunk. The electronic device, when sensing such a situation, may notify the parent terminal of the corresponding situation using alert level 3 (e.g., the highest alert level) configured to correspond to the situation. In various embodiments, the counterpart electronic device may forward the corresponding situation to the user of the counterpart electronic device through an output corresponding to alert level 3.

According to various embodiments of the present disclosure, in instances in which a manager holds and operates the first electronic device (e.g., a smart phone) and a user (e.g., a child) wears the second electronic device (e.g., a wearable device), the first electronic device may provide a remote control function over the second electronic device. In various embodiments, the cases of using the electronic devices as described above may be implemented for various situations, such as, for example, a situation for the prevention of a missing-child, a situation for notifying of an emergency situation, etc.

According to an embodiment, the second electronic device (e.g., a wearable device) may monitor the state of the user (e.g., a child) who is wearing the second electronic device under a preset condition and detect whether the user is in an emergency situation on the basis of the monitoring result. When the second electronic device senses the user's emergency situation under the preset condition, the second electronic device may transfer various types of information associated with the corresponding situation (e.g., information for notifying of the user's current state) to the counterpart electronic device (e.g., a parent terminal) connected thereto or another pre-specified electronic device (or a server (e.g., a police station or a fire station)). An operation of notifying of the user's current state on the basis of the second electronic device will be described below with reference to FIGS. 17 and 18.

Figure 17:
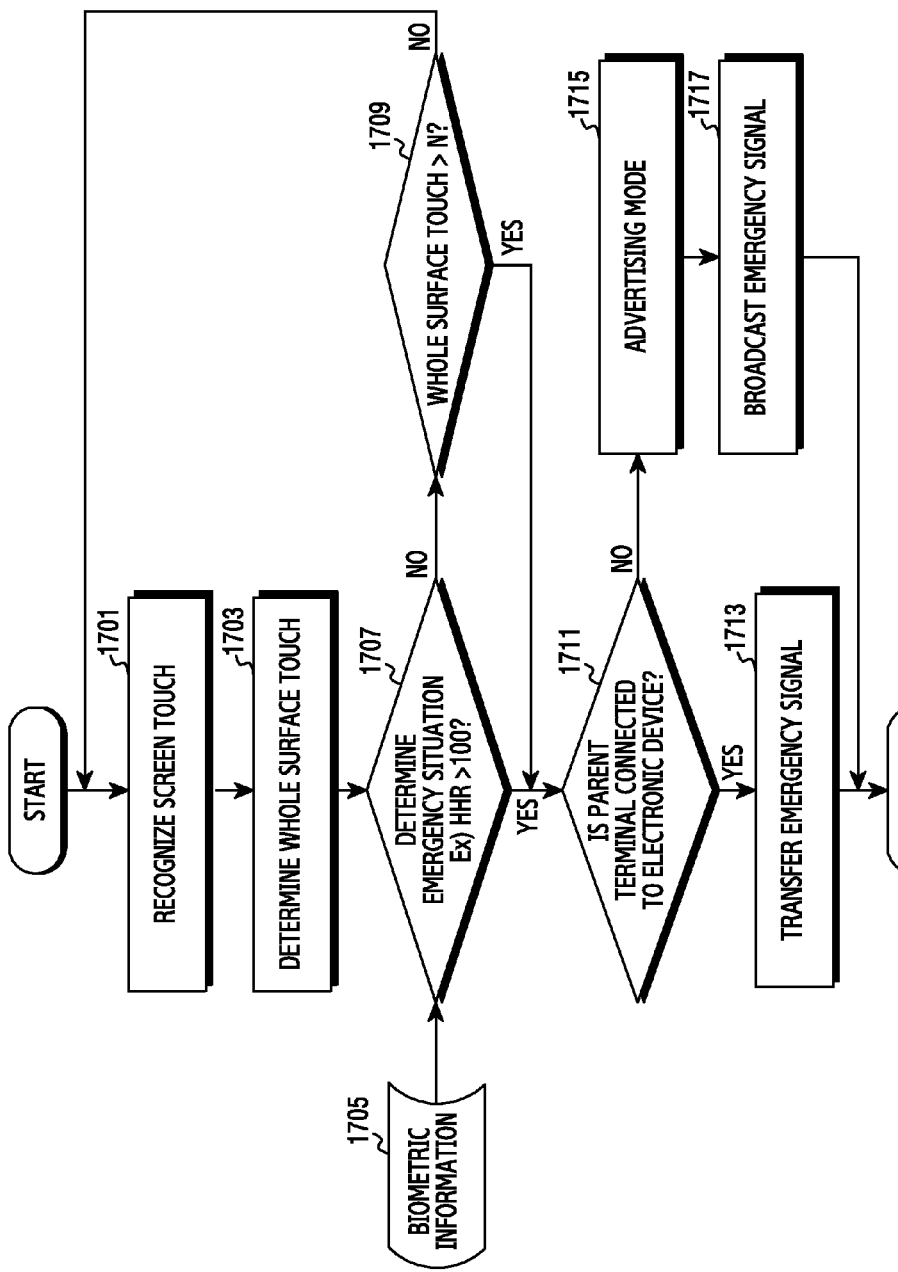
FIG. 17 is a flowchart of an example of a process, according to various embodiments of the present disclosure.

FIG. 17 is a flowchart of an example of a process, according to various embodiments of the present disclosure.

Referring to FIG. 17, an example of entering an emergency mode through a screen touch operation on the basis of a touch screen of the electronic device and transmitting a user's state information sensed according to that is illustrated in FIG. 17. In various embodiments, the state information may be transmitted to a counterpart electronic device (e.g., a parent terminal) connected to the electronic device or another electronic device (e.g., a server, a neighboring electronic device, etc.) configured in advance according to an emergency service. According to an embodiment, a case where the user (e.g., a child) has difficulty identifying or accurately recognizing text or performing a sliding operation may be considered. Accordingly, in various embodiments, in instances in which the user touches the whole surface of the touch screen several times at predetermined intervals, the touches are counted, and when the total sensed-touch count is larger than a predetermined number, it may be recognized that the user is placed in an emergency or call situation.

The electronic device may recognize a screen touch on the basis of the touch screen thereof in operation 1701, and may determine whether the recognized screen touch is a touch on the whole surface of the touch screen in operation 1703.

The electronic device, when sensing the touch over the whole surface based on operations 1701, 1703, may acquire the user's biometric information in operation 1705. In various embodiments, the biometric information may be acquired by an internal sensor provided in the electronic device or an external sensor interworking with the electronic device. The electronic device may consistently monitor the user's state through the sensor and store the biometric information associated with the user's state corresponding to the monitoring result. The electronic device may monitor the user's state on the basis of the sensor and acquire biometric information stored when the touch over the whole surface is sensed as in operations 1701, 1703 or biometric information according to the user's state at the time when the touch over the whole surface is sensed.

In operation 1707, the electronic device may determine whether the user is placed in an emergency situation on the basis of the acquired biometric information. For example, the electronic device may identify the user's highest heart rate (HHR) and compare the HHR with a preset value (e.g., 100). The electronic device may determine that the user is in an abnormal state (e.g., emergency situation) when the HHR is higher than the preset value and may determine that the user is in a normal state when the HHR is lower than or equal to the preset value.

When it is determined in operation 1707 that the user is not in an emergency situation, the electronic device may determine whether the touch over the whole surface has been sensed a preset number (e.g., N, where N is a natural number) of times or more in operation 1709. For example, the user may enter a touch input N times over the whole surface of the touch screen of the electronic device, and the electronic device may count the user's touch inputs and determine whether touches over the whole surface have been entered more than the preset number (N) of times.

When it is determined in operation 1709 that the touches over the whole surface have been entered the preset number (N) of times or less, the electronic device may proceed to operation 1701 to perform the following operations.

When it is determined in operation 1707 that the user is in an emergency situation, or when it is determined in operation 1709 that touches over the whole surface have been entered more than the preset number (N) of times, the electronic device may proceed to operation 1711 to perform the following operations.

In operation 1711, the electronic device may identify the connection state of the counterpart electronic device (e.g., a parent terminal). For example, the electronic device may check whether the parent terminal has been connected thereto on the basis of at least one communication method.

When it is identified in operation 1711 that the parent terminal has been connected to the electronic device, the electronic device may transmit an emergency signal including state information (e.g., biometric information, position information, etc.) on the user's state to the parent terminal connected thereto in operation 1713.

When it is identified in operation 1711 that the parent terminal is not connected to the electronic device, the electronic device may execute an advertising mode (or change to an advertising mode) in operation 1715. For example, in instances in which the electronic device fails to sense the existing parent terminal or is not connected to the parent terminal, the electronic device may change to a Bluetooth low energy (BLE) beacon advertising mode.

In operation 1717, the electronic device may broadcast an emergency signal in the advertising mode. For example, the electronic device may change to the BLE beacon advertising mode and broadcast a pre-standardized emergency signal. In various embodiments, the emergency signal may be sensed only by the electronic devices in instances in which the electronic devices have subscribed to a specific service (e.g., a missing-child search service, etc.) in advance.

Figure 18:
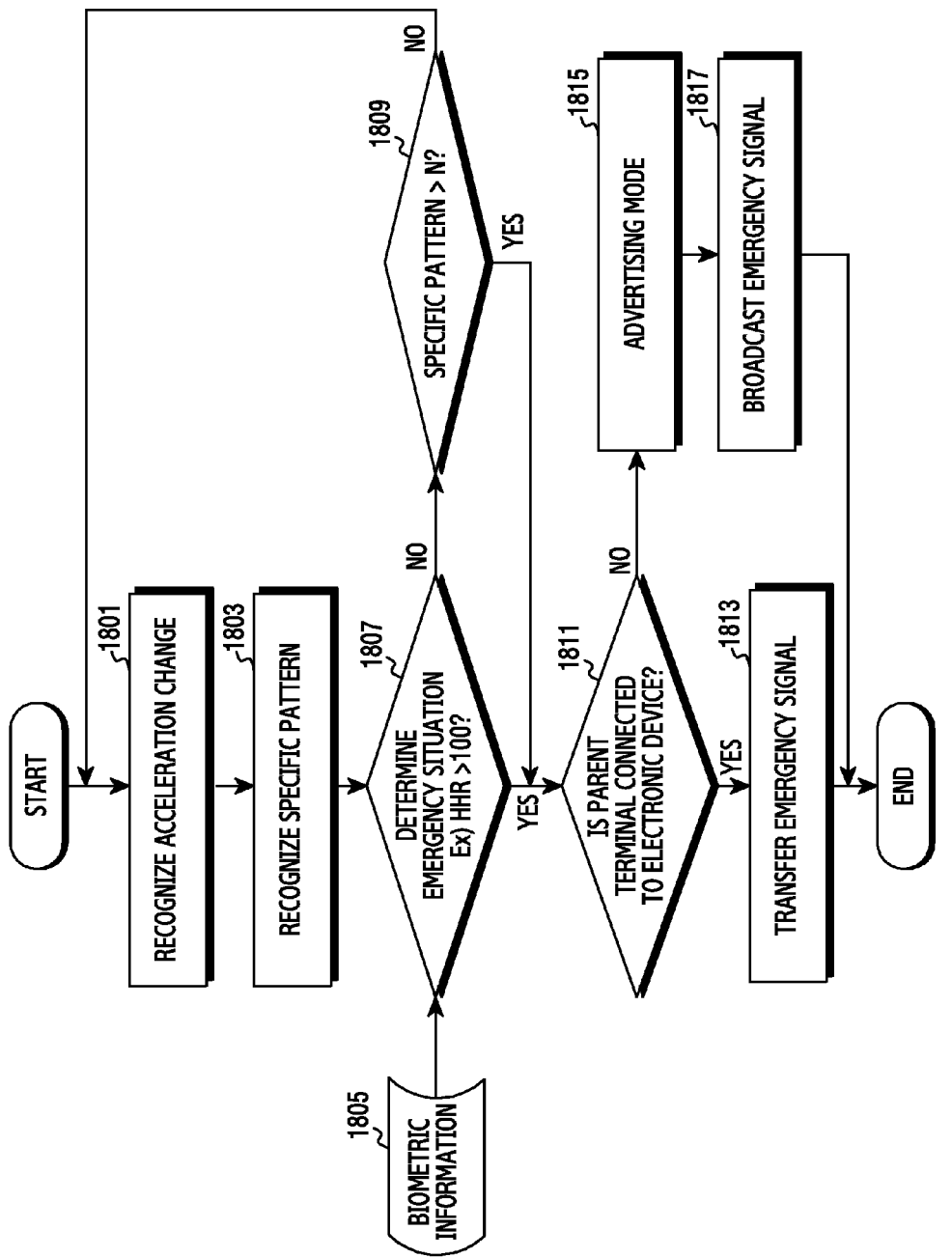
FIG. 18 is a flowchart of an example of a process, according to various embodiments of the present disclosure.

FIG. 18 is a flowchart of an example of a process, according to various embodiments of the present disclosure.

Referring to FIG. 18, an example of entering an emergency mode by sensing a motion of the electronic device on the basis of an acceleration sensor of the electronic device and transmitting a user's state information sensed according to that is illustrated in FIG. 18. In various embodiments, the state information may be transmitted to a counterpart electronic device (e.g., a parent terminal) connected to the electronic device or another electronic device (e.g., a server, a neighboring electronic device, etc.) configured in advance according to an emergency service. According to an embodiment, a case where the user (e.g., a child) changes the acceleration of the electronic device with a specific hand motion (e.g., hitting the bottom or a wall with his/her palm or clenching and shaking his/her fist) may be considered. Accordingly, in various embodiments, when the electronic device senses an acceleration change of a predetermined value or more, it may be recognized that the user is placed in an emergency or call situation.

The electronic device may sense an acceleration change on the basis of an acceleration sensor in operation 1801 and recognize a specific pattern for the sensed acceleration change in operation 1803. For example, the electronic device may analyze a pattern in which the acceleration varies and determine whether the analyzed pattern corresponds to a preset pattern.

The electronic device, when sensing the preset specific pattern based on the operations 1801, 1803, may acquire the user's biometric information in operation 1805. For example, the electronic device may acquire the biometric information using a method corresponding to the description referring to the operation 1705 of FIG. 17.

In operation 1807, the electronic device may determine whether the user is placed in an emergency situation on the basis of the acquired biometric information. For example, the electronic device may determine the emergency situation of the user through an operation corresponding to the description referring to the operation 1707 of FIG. 17.

When it is determined in operation 1807 that the user is not in an emergency situation, the electronic device may determine whether the specific pattern has been sensed a preset number (e.g., N, where N is a natural number) of times or more in operation 1809. For example, the user may generate a specific pattern of the electronic device (e.g., a change in acceleration by a repetitive reciprocating motion) N times while grasping the electronic device. The electronic device may count a specific pattern input (e.g., acceleration change) and determine whether the specific pattern has been input more than the preset number (N) of times.

When it is determined in operation 1809 that the specific pattern has been input the preset number (N) of times or less, the electronic device may proceed to operation 1801 to perform the following operations.

When it is determined in operation 1807 that the user is in an emergency situation, or when it is determined in operation 1809 that the specific pattern has been input more than the preset number (N) of times, the electronic device may proceed to operation 1811 to perform the following operations.

In various embodiments, operations 1811, 1813, 1815, 1817 may be performed through operations corresponding to the descriptions referring to the operations 1711, 1713, 1715, 1717 of FIG. 17 described above, and descriptions thereof will be omitted.

As described above, according to the various embodiments, the electronic device may sense the screen touch operation, such as the touch over the whole surface, N times or more on the basis of the touch screen, or may sense the acceleration change of the specific pattern N times or more on the basis of the acceleration sensor (or gyro sensor). The electronic device may determine to enter an emergency mode on the basis of the sensing result.

In various embodiments, the electronic device, when determining to enter the emergency mode, may perform error correction using a biometric sensor that can sense the user's heartbeat. For example, the electronic device may check the degree of the heartbeat on the basis of the biometric sensor and determine that the user is in an emergency situation in instances in which a heartbeat of a predetermined level or more is sensed. The electronic device, when sensing the user's emergency situation, may notify the user's emergency situation to the counterpart electronic device (e.g., a parent terminal) connected thereto or another electronic device therearound.

An embodiment of notifying a pre-registered parent terminal of a user's emergency situation, according to various embodiments, will be described below.

According to an embodiment, in instances in which an electronic device is always connected to the parent terminal through BLE, etc., the electronic device may notify the parent terminal of the user's emergency situation in real time.

According to an embodiment, in instances in which the electronic device fails to sense the parent terminal, or is not connected to the parent terminal, the electronic device may change to a BLE beacon advertising mode. The electronic device may change to the BLE beacon advertising mode and broadcast a pre-standardized emergency signal. In various embodiments, the emergency signal may be implemented so as to be sensed only by an electronic device having subscribed to a specific service (e.g., a missing-child search service), or may be implemented so as to be sensed by all electronic devices around the electronic device. In various embodiments, another electronic device that receives an emergency signal from the electronic device may forward the emergency signal to a relating parent terminal or contact on the basis of a pre-registered list (e.g., an emergency list). For example, the other electronic device may sense an emergency signal broadcast by the electronic device to identify an emergency list, and may transmit, to the parent terminal, an emergency message including the position information of the electronic device (or the position information of the other electronic device having received the emergency signal), emergency signal reception time information, BLE beacon code information, and the like. The other electronic device may transmit the emergency message to the parent terminal using wireless communication such as cellular communication, etc. In various embodiments, in instances in which the other electronic device fails to sense the parent terminal, the other electronic device may also record and transmit emergency information using Wi-Fi naming. In various embodiments, the emergency list may be stored as a specific database (e.g., a kids list DB) in the other electronic device, or may be stored in an external server. The other electronic device may identify the emergency list corresponding to the emergency signal from the internal database or the external server.

According to various embodiments of the present disclosure, even when a manager operates the first electronic device (e.g., a smart phone) and a user (e.g., a child) wears the second electronic device (e.g., a wearable device), a PTT function as described above may be provided.

The examples in which electronic devices are connected to each other in one-to-one correspondences as the first and second electronic devices have been described above. However, according to various embodiments of the present disclosure, it is also possible to control one second electronic device (e.g., a wearable device) and a plurality of first electronic devices (e.g., a smart phone, a tablet PC, etc.), and vice versa. According to an embodiment, a manager (e.g., a parent) may control a plurality of electronic devices (e.g., a smart phone, a tablet PC, etc.) using one electronic device (e.g., a wearable device), or may control one electronic device (e.g., a smart phone or a tablet PC) using a plurality of electronic devices (e.g., a plurality of wearable devices). For example, in various embodiments, electronic devices may perform operations, according to the various embodiments of the present disclosure, through one to N (N is a natural number larger than or equal to 2) communication as well as one to one communication.

According to various embodiments, an operating method for an electronic device may include: sensing a specific situation to transmit a notification message for the situation to another electronic device; and controlling a mode on the basis of a control message received from the other electronic device. The specific situation may be a situation where a specified user using the electronic device is identified or a situation where the electronic device is activated. The control message may be a message that is determined in order to perform a preset specific mode in correspondence to the specified user. The controlling may include changing the mode to a mode for restricting the execution of at least one program. The controlling may include not changing the mode in instances in which the received control message does not include a user input. Sensing the specific situation to transmit the notification message for the situation to the other electronic device may include detecting a case where the user's detected biometric information is beyond a specified range. The operating method may further includes: backing up at least a part of a user interface, data, and setting information at the time of a mode change; and performing a recovery function on the basis of the backup at the time of the termination of the changed mode. Sensing the specific situation to transmit the notification message for the situation to the other electronic device may include identifying the quality of communication with the other electronic device, and changing the mode may include changing to at least one of a real-time call connection and a restricted call connection on the basis of the communication quality.

According to various embodiments of the present disclosure, an operating method for an electronic device may include: establishing wireless communication with another electronic device using a communication interface; sensing a change of state of the electronic device; transmitting first information associated with the change of state to the other electronic device using the communication interface; receiving second information associated with the control of the electronic device from the other electronic device using the communication interface; and performing a process of the electronic device using the second information.

According to various embodiments, the sensing of the change of state may include determining whether at least one of an event received from the outside, a use event of the electronic device, and a user's change of state in the electronic device occurs.

According to various embodiments, the transmitting of the first information may include: identifying users of the electronic device and the other electronic device when sensing the change of state of the electronic device; and providing an event generated by the electronic device to the other electronic device when the users of the electronic devices differ from each other. According to various embodiments, the transmitting of the first information may include omitting an output of an event corresponding to a call, a message, or an application notification that is received from the outside and transferring the corresponding event to the other electronic device.

According to various embodiments, the identifying of the user may include determining that the users of the electronic devices differ from each other when a specific mode is configured to restrict the use of the electronic device. According to various embodiments, the identifying of the user may include determining whether the users of the electronic devices are the same as each other on the basis of the distance between the electronic device and the other electronic device.

According to various embodiments, the transmitting of the first information may include notifying the other electronic device of information relating to an event in which the electronic device is used when the users of the electronic devices differ from each other.

According to various embodiments, the operating method may further include: acquiring wearing information of the other electronic device from the other electronic device; and determining the wearing state of the other electronic device on the basis of the acquired wearing information.

According to various embodiments, the operating method may further include: executing a push to talk (PTT) function in response to a request of the other electronic device or a user input; and processing data transmission or reception according to the execution of the PTT function through the communication interface. According to various embodiments, the processing may include: determining a connection state between the electronic device and the other electronic device when executing the PTT function; and processing the data in real time or in a predetermined time unit (e.g., on a configured time) basis to correspond to the connection state. According to various embodiments, the processing may include executing the PTT function on the basis of a signal configured between the electronic device and the other electronic device to correspond to the connection state.

According to various embodiments, the operating method may further include: backing up at least a part of a user interface, data, and setting information of the electronic device when sensing the use event of the electronic device; and recovering the electronic device on the basis of the backup in response to the control of the other electronic device or release of the use event of the electronic device.

According to various embodiments, the operating method may further include: sensing the user's change of state from at least one sensor; determining whether the change of state is included in a preset reference; and transmitting information corresponding to the change of state to the other electronic device when the change of state is included in the preset reference.

As described above, according to the various embodiments of the present disclosure, an electronic device can provide various types of controllable functions through another electronic device, thereby enhancing availability thereof. According to the various embodiments, in instances in which a parent allows a child to use an electronic device (e.g., a smart phone or a tablet PC), the parent can control various functions of the electronic device using a wearable device connected to the electronic device. Accordingly, in the various embodiments, the parent can be provided with a notification of the child's use of the electronic device or a remote control function through the wearable device, thereby enhancing the availability of the electronic device and the wearable device. Furthermore, according to the various embodiments, a parent can perform various monitoring on a child wearing a gear through an electronic device (e.g., a smart phone or a tablet PC) and can identify and control a notification of the child's states.

Various embodiments performed by the electronic device 101 may be operations that are performed under the control of the processor 120. In addition, the electronic device 101 may include a separate module from the processor 120, which is programmed to control various embodiments of the present disclosure. The separate module that is programmed to control various embodiments of the present disclosure may be executed based on a control of the processor 120.

Each of the above-described elements of the electronic device according to various embodiments of the present disclosure may include one or more components, and the name of a corresponding element may vary according to the type of electronic device. The electronic device according to various embodiments of the present disclosure may include at least one of the above-described elements and may exclude some of the elements or further include other additional elements. Further, some of the elements of the electronic device according to various embodiments of the present disclosure may be coupled to form a single entity while performing the same functions as those of the corresponding elements before the coupling.

According to various embodiments of the present disclosure, at least some of the devices or methods according to various embodiment of the present disclosure as defined by the appended claims and/or disclosed herein may be implemented in the form of hardware, software, firm ware, or any combination (e.g., module or unit) of at least two of hardware, software, and firmware. The "module" may be interchangeable with a term, such as a unit, a logic, a logical block, a component, or a circuit. The "module" may be a minimum unit of an integrated component element or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter. If implemented in software, a computer-readable storage medium (or storage medium readable by a computer) storing at least one program (or programming module) may be provided. The software may, for example, be implemented by instructions stored in a computer-readable storage medium in the form of a programming module. The at least one program may include instructions that cause the electronic device to perform the methods according to various embodiments of the present disclosure as defined by the appended claims and/or disclosed herein. When the command is executed by one or more processors (for example, the processor 120), the one or more processors may execute a function corresponding to the command. The computer-readable storage medium may, for example, be the memory 230. At least a part of the programming module may, for example, be implemented (e.g., executed) by the processor 120. At least a part of the programming module may, for example, include a module, a program, a routine, a set of instructions, or a process for performing at least one function.

The computer-readable storage medium may include magnetic media such as a hard disc, a floppy disc, and a magnetic tape; optical media such as a compact disc read-only memory (CD-ROM) and a digital versatile disc (DVD); magneto-optical media such as a floptical disk; a hardware device specifically configured to store and execute program instructions (e.g., programming module), such as a read-only memory (ROM), a random access memory (RAM), and a flash memory; an electrically erasable programmable read-only memory (EEPROM); a magnetic disc storage device; any other type of optical storage device; and a magnetic cassette. Alternatively, any combination of some or all of the may form a memory in which the program is stored. Further, a plurality of such memories may be included in the electronic device. In addition, the program instructions may include high-class language codes, which can be executed in a computer by using an interpreter, as well as machine codes made by a compiler.

In addition, the program may be stored in an attachable storage device capable of accessing the electronic device through a communication network such as the Internet, an intranet, a local area network (LAN), a wide LAN (WLAN), a storage area network (SAN), or any combination thereof. The storage devices may be connected to an electronic device through an external port. Further, a separate storage device on the communication network may access a portable electronic device. Any of the hardware devices as described above may be configured to work as one or more software modules in order to perform the operations according to various embodiments of the present disclosure, and vice versa.

Any of the modules or programming modules according to various embodiments of the present disclosure may include at least one of the above-described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

FIGS. 1-18 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device comprising:
   a communication interface;
   a memory;
   one or more sensors; and
   at least one processor coupled to the memory and the communication interface, wherein the at least one processor is configured to:
   detect a change of state of the electronic device using the one or more sensors;
   transmit to a secondary electronic device a first information associated with the change of state of the electronic device;
   receive a second information associated with a control of the electronic device from the secondary electronic device in response to transmitting the first information;
   perform an operation based on the second information,
   receive an incoming communication;
   detect whether the electronic device and the secondary electronic device are being used by different users; and
   transmit to the secondary electronic device an indication of the incoming communication when the electronic device and the secondary electronic device are being used by different users.

2. The electronic device of claim 1, wherein the change of state is detected based on at least one of an external event, a use event associated with the electronic device, or an event associated with a change of state of a user of the electronic device.

3. The electronic device of claim 2, wherein the at least one processor is configured to transmit, to the secondary electronic device, information relating to a mode in which the electronic device is operated when the electronic device and the secondary electronic device are used by different users.

4. The electronic device of claim 2, wherein the processor is configured to:
   perform a back-up operation in response to the use event; and
   restore a state of the electronic device based on data that is stored as a result of executing the back-up operation, wherein the state of the electronic device is restored in response to a signal that is received from the secondary electronic device or a release of the use event.

5. The electronic device of claim 2, wherein the at least one processor is further configured to:
   detect the user's change of state by using at least one sensor;
   detect whether the user's change of state is included in a preset reference; and
   transmit information corresponding to the user's change of state to the secondary electronic device, when the user's change of state is included in the preset reference.

6. The electronic device of claim 1, wherein the incoming communication includes one of a telephone call or a message, and transmitting the indication of the incoming communication includes transferring the incoming communication to the secondary electronic device.

7. The electronic device of claim 1, wherein the detecting of the change of state is performed in response to the electronic device being in a restricted-use mode.

8. The electronic device of claim 1, wherein the detecting of the change of state is performed based on a distance between the electronic device and the secondary electronic device.

9. The electronic device of claim 1, wherein the electronic device includes a wearable electronic device, and the at least one processor is further configured to receive data obtained by using one or more sensors in the secondary electronic device and detect whether the electronic device is currently being worn based on the data.

10. The electronic device of claim 1, wherein the processor is configured to transmit data to the secondary electronic device by using a push-to-talk (PTT) function.

11. The electronic device of claim 10, wherein the data is transmitted in real-time or in a predetermined time unit based on a state of a connection between the electronic device and the secondary electronic device.

12. The electronic device of claim 10, wherein the at least one processor is configured to execute the PTT function in response to a signal that is received from the secondary electronic device.

13. A method comprising:
    establishing a wireless connection between a first device and a second device;
    detecting a change of state of the first device using one or more sensors in the first device;
    transmitting from the first device to the second device a first information associated with the change of state of the first device;
    receiving, by the first device, a second information associated with a control of the first device that is transmitted by the second device in response to transmitting the first information;
    performing, by the first device, an operation based on the second information,
    receiving an incoming communication;

detecting whether the first device and the second device are being used by different users; and transmitting to the second device an indication of the incoming communication when the first device and the second device are being used by different users.

14. The method of claim 13, wherein the change of state is detected based on at least one of an external event, a use event associated with the first device, or an event associated with a change of state of a user of the first device.

15. The method of claim 14, further comprising transmitting, to the second device, information relating to a mode in which the first device is operated when the first device and the second device are used by different users.

16. The method of claim 14, further comprising:

performing a back-up operation in response to the use event; and restoring a state of the first device based on data that is stored as a result of executing the back-up operation, wherein the state of the first device is restored in response to a signal that is received from the second device or a release of the use event.

17. The method of claim 14, further comprising:

detecting the user's change of state by using at least one sensor;

detecting whether the user's change of state is included in a preset reference; and transmitting information corresponding to the user's change of state to the second device, when the user's change of state is included in the preset reference.

18. The method of claim 13, wherein the incoming communication includes one of a telephone call or a message, and transmitting the indication of the incoming communication includes transferring the incoming communication to the second device.

19. The method of claim 13, wherein the detecting is performed in response to the first device being in a restricted-use mode.

20. The method of claim 13, wherein the detecting is performed based on a distance between the first device and the second device.

21. The method of claim 13, wherein the first device includes a wearable first device, further comprising receiving data obtained by using one or more sensors in the second device and detect whether the first device is currently being worn based on the data.

22. The method of claim 13, further comprising transmitting data to the second device by using a push-to-talk (PTT) function.

23. The method of claim 22, wherein the data is transmitted in real-time or in a predetermined time unit based on a state of the connection between the first device and the second device.

24. The method of claim 22, further comprising executing the PTT function in response to a signal that is received from the second device.

* * * * *